(12) United States Patent
Hori et al.

(10) Patent No.: US 12,738,778 B2
(45) Date of Patent: Sep. 15, 2026

(54) ELECTRICAL INSULATOR WITH PROJECTIONS IN INNER WALLS AROUND STATOR CORE TEETH FOR MOTOR

(71) Applicant: AICHI ELECTRIC CO., LTD., Kasugai (JP)

(72) Inventors: Takashi Hori, Kasugai (JP); Masahiro Hasegawa, Kasugai (JP); Shoji Mano, Kasugai (JP); Yang Song, Suzhou (CN); Yuqian Zhu, Suzhou (CN)

(73) Assignee: AICHI ELECTRIC CO., LTD., Kasugai (JP)

( * ) Notice: Subject to any disclaimer, the term of this patent is extended or adjusted under 35 U.S.C. 154(b) by 246 days.

(21) Appl. No.: 18/602,556

(22) Filed: Mar. 12, 2024

(65) Prior Publication Data

US 2025/0047149 A1 Feb. 6, 2025

(30) Foreign Application Priority Data

Aug. 4, 2023 (CN) ......................... 202310982486.2

(51) Int. Cl.
*H02K 1/14* (2006.01)
*H02K 3/52* (2006.01)
*F04D 25/06* (2006.01)

(52) U.S. Cl.
CPC ............. *H02K 1/148* (2013.01); *H02K 3/522* (2013.01); *F04D 25/0693* (2013.01)

(58) Field of Classification Search
CPC ............... H02K 15/0012; H02K 15/10; H02K 2213/12; H02K 3/30; H02K 3/32;
(Continued)

(56) References Cited

U.S. PATENT DOCUMENTS 3,339,097 A * 8/1967 Dunn ..................... H02K 3/522 310/194
6,509,665 B1 * 1/2003 Nishiyama ............. H02K 9/223 310/194

(Continued)

FOREIGN PATENT DOCUMENTS

JP S51114605 A 9/1976
JP S5438806 U 3/1979

(Continued)

OTHER PUBLICATIONS

JP20100279131 English Translation.*

(Continued)

*Primary Examiner* — Maged M Almawri
(74) *Attorney, Agent, or Firm* — J-TEK LAW PLLC; Jeffrey D. Tekanic; Scott T. Wakeman

(57) ABSTRACT

An electrical insulator has a tooth insertion hole defined by an inner wall of the electrical insulator and is configured to be fitted onto a radially extending tooth of a stator core such that the tooth is located in the tooth insertion hole. At least two opposing surfaces of the tooth insertion hole have axial-, radial- and/or circumferentially-extending projections configured to abut an opposing side of the tooth in the tooth insertion hole to at least substantially prevent relative movement between the tooth and the electrical insulator while making it easier to insert the tooth into the tooth insertion hole without damaging the tooth.

20 Claims, 26 Drawing Sheets

(58) Field of Classification Search
CPC .......... H02K 3/34; H02K 3/345; H02K 3/522; H02K 1/148; H02K 1/185; H02K 1/278; H02K 21/16
USPC .......................................................... 310/194
See application file for complete search history.

(56) References Cited

U.S. PATENT DOCUMENTS 6,566,779 B2 * 5/2003 Takano .................. H02K 3/522 310/194
7,382,075 B2 * 6/2008 Wang ..................... H02K 3/522 310/260
8,754,562 B2 * 6/2014 Platon ...................... H02K 3/44 310/215
10,840,780 B2 * 11/2020 Kim ....................... H02K 13/10
11,286,956 B2 * 3/2022 Kajikawa ................. H02K 7/14
11,456,637 B2 * 9/2022 Sakauchi ............... H02K 1/146
11,909,296 B2 * 2/2024 Jeong .................. F16C 32/0461
12,081,098 B2 * 9/2024 Nakamura ............. H02K 1/185
2001/0017501 A1 * 8/2001 Suzuki ................... H02K 3/522 310/261.1
2003/0098630 A1 * 5/2003 Owada ..................... H02K 3/24 310/194
2005/0012413 A1 * 1/2005 Bott ....................... H02K 3/522 310/71
2005/0044692 A1 * 3/2005 Takano ................ H02K 15/095 29/605
2007/0222324 A1 * 9/2007 Fukui ..................... H02K 9/223 310/260
2009/0100861 A1 4/2009 Higuchi et al.
2009/0189474 A1 * 7/2009 van Heyden .......... H02K 3/522 310/195
2010/0188181 A1 * 7/2010 Urano .................... H02K 3/522 336/198
2010/0213784 A1 * 8/2010 Iizuka .................... H02K 1/148 29/596
2010/0275436 A1 * 11/2010 Kiyono .................. H02K 15/12 29/596
2012/0098380 A1 * 4/2012 Wang ................. H02K 15/0431 310/260
2012/0256512 A1 * 10/2012 Fubuki ................... H02K 3/345 310/215
2012/0286619 A1 * 11/2012 Tsuiki .................... H02K 3/522 310/215
2013/0009512 A1 * 1/2013 Tashiro ............. H02K 15/0431 310/215
2013/0020885 A1 * 1/2013 Hsieh ....................... H02K 5/08 310/43
2013/0193800 A1 * 8/2013 Yokogawa ............. H02K 3/522 310/215
2019/0319500 A1 * 10/2019 Shinohara ............ H02K 15/022
2021/0099033 A1 * 4/2021 Shinohara .............. H02K 21/16
2023/0412030 A1 * 12/2023 Motoishi ................ H02K 3/522

FOREIGN PATENT DOCUMENTS

JP 2007285266 A 11/2007
JP 2008178223 A 7/2008
JP 2010279131 A * 12/2010
JP 2011193573 A 9/2011
JP 2013135585 A 7/2013
JP 2015119537 A 6/2015
JP 2019097261 A 6/2019
JP 2021141746 A 9/2021

OTHER PUBLICATIONS

Office Action from the Japanese Patent Office dispatched Jun. 24, 2025, in related Japanese application No. 2023-159163, and translation thereof.
Office Action from the Japanese Patent Office dispatched Jan. 21, 2025, in related Japanese application No. 2023-159163, and machine translation thereof.
Office Action from the Japanese Patent Office dispatched Dec. 2, 2025, in related Japanese application No. 2023-159163, and machine translation thereof.

* cited by examiner

ELECTRICAL INSULATOR WITH PROJECTIONS IN INNER WALLS AROUND STATOR CORE TEETH FOR MOTOR

CROSS-REFERENCE

The present application claims priority to Chinese patent application serial number 202310982486.2 filed on Aug. 4, 2023, the contents of which are incorporated fully herein by reference.

TECHNICAL FIELD

The present disclosure relates to an electrical insulator that is fittable onto a tooth of a stator core, and more particularly to an electrical insulator that is fittable (e.g., press-fittable) onto a tooth of a stator core by inserting the tooth of the stator core into a tooth insertion hole formed in the electrical insulator.

BACKGROUND

A compressor (sometimes referred to herein as an "electric compressor") that includes a compression mechanism part driven by a motor may be provided in an air conditioner (a domestic air conditioner, a vehicle air conditioner, or the like) or in a refrigerator, or the like. Such an electric compressor is disclosed, for example, in JP 2007-285266 A (family member US 2009/100861).

Furthermore, a motor for driving a compression mechanism part (sometimes referred to herein as a "concentrated winding motor") may include a stator core having a plurality of teeth, a plurality of electrical insulators (sometimes called "resin bobbins" or "insulation members") that are respectively fitted onto the teeth of the stator core, and a stator winding that is wound around each of the electrical insulators.

Such a concentrated winding motor is disclosed, for example, in JP 2013-135585 A.

In the motor disclosed in JP 2013-135585 A, the electrical insulator has a tooth insertion hole into which a tooth of the stator core is inserted. The tooth has first and second outer wall surfaces respectively formed on first and second axial sides and third and fourth outer wall surfaces respectively formed on first and second circumferential sides. An inner wall surface defining the tooth insertion hole includes first to fourth inner wall surfaces that respectively face the first to fourth outer wall surfaces of the tooth. Furthermore, the first to fourth inner wall surfaces of the electrical insulator are configured to have surface contact respectively with the first to fourth outer wall surfaces of the tooth. Thus, the electrical insulator is restrained from moving relative to the tooth during transportation or operation.

SUMMARY

However, because the electrical insulator disclosed in JP 2013-135585 A is configured such that the first to fourth inner wall surfaces defining the tooth insertion hole have surface contact respectively with the first to fourth outer wall surfaces of the tooth, it is difficult to insert the tooth into the tooth insertion hole (in other words to push the electrical insulator over the tooth).

Furthermore, the stator core is typically composed of a plurality of electromagnetic steel sheets laminated in the axial direction. In the electrical insulator disclosed in JP 2013-135585 A, when the tooth is inserted into the tooth insertion hole, a large load is applied in the plane of the two electromagnetic steel sheets located at (on) the first and second sides of the tooth in the axial direction. When a such large load is applied, one or more of the electromagnetic sheets may be deformed (for example, waving or curling up). Deformation of the electromagnetic steel sheets arranged on both sides of the tooth in the axial direction would make it more difficult to insert the tooth into the tooth insertion hole.

It might be conceivable to create a clearance between the outer wall surface of the tooth and the inner wall surface of the tooth insertion hole in order to facilitate insertion of the tooth into the tooth insertion hole. However, if such a clearance is created between the outer wall surface of the tooth and the inner wall surface of the tooth insertion hole, the electrical insulator may move relative to the tooth.

Accordingly, it is one non-limiting object of the present disclosure to disclose techniques for improving an electrical insulator that is configured to be restrained (prevented, restricted, blocked) from moving relative to a stator tooth while still allowing the tooth to be easily inserted into a tooth insertion hole of the electrical insulator. Further, it is another non-limiting object of the present disclosure to disclose a motor and a compressor that use an electrical insulator of the present disclosure.

A first aspect of the present disclosure relates to an electrical insulator.

The electrical insulator according to this aspect has a tooth insertion hole into which a tooth of a stator is inserted. The tooth extends in a radial direction and has first to fourth outer wall surfaces. The first and second outer wall surfaces are formed (defined) on first and second axial sides of the tooth, and the third and fourth outer wall surfaces are formed (defined) on first and second circumferential sides of the tooth.

The electrical insulator of the present disclosure has an inner wall that defines the tooth insertion hole and projections (ribs or ridges) protruding from the inner wall into the tooth insertion hole.

The inner wall of the tooth insertion hole includes first, second, third and fourth inner wall surfaces that respectively face the first, second, third and fourth outer wall surfaces of the tooth when the tooth is inserted into the tooth insertion hole. In other words, the inner wall of the tooth insertion hole includes first and second inner wall surfaces formed (defined) on the first and second axial sides and third and fourth inner wall surfaces formed (defined) on the first side and second circumferential sides.

The projections include at least one set of projections selected from a group consisting of a first set of projections located on the first inner wall surface and the second inner wall surface and a second set of projections located on the third inner wall surface and the fourth inner wall surface. The first set of projections includes at least one first projection formed on the first inner wall surface and at least one second projection formed on the second inner wall surface. The second set of projections includes at least one third projection formed on the third inner wall surface and at least one fourth projection formed on the fourth inner wall surface.

The electrical insulator of this aspect is configured to be restrained (prevented, restricted, blocked) from moving relative to the tooth by abutment between the first to fourth outer wall surfaces of the tooth and the projections of the at least one set of the projections.

In the electrical insulator of this aspect, the outer wall surface of the tooth abuts on the projections formed on the inner wall that defines the tooth insertion hole so that the contact area is reduced as compared with (to) a structure in which the outer wall surface of the tooth abuts on the inner wall that defines the tooth insertion hole. The resistance to inserting the tooth into the tooth insertion hole is reduced by this reduction of the contact area. The force of holding the electrical insulator on the tooth is set by adjusting the height (the protruding length from the inner wall) of the projections.

According to the electrical insulator of this aspect, the electrical insulator is restrained from moving relative to the tooth, while the tooth can still be easily inserted into the tooth insertion hole.

In another aspect of the electrical insulator, the projections may include at least the second set of projections. In other words, the projections include the at least one third projection and the at least one fourth projection.

In the electrical insulator of this aspect, the electrical insulator is restrained (prevented, restricted, blocked) from moving relative to the tooth by abutment between the third and fourth outer wall surfaces that are respectively formed (defined) on the first and second sides of the tooth in the circumferential direction and the projections that are formed on the third and fourth inner wall surfaces respectively formed (defined) on the first and second sides of the electrical insulator in the circumferential direction.

According to the electrical insulator of this aspect, a load applied to the first and second outer wall surfaces respectively formed on the first and second sides of the tooth in the axial direction is reduced.

Generally, the stator core is composed of electromagnetic steel sheets laminated (stacked) in the axial direction. In the electrical insulator of this aspect, a load applied in the radial direction to the first and second outer wall surfaces respectively formed on the first and second sides of the tooth in the axial direction is reduced when the tooth is inserted into the tooth insertion hole (or the electrical insulator is pushed onto the tooth). Thus, deformation of the electromagnetic steel sheets arranged on the first and second sides of the tooth in the axial direction can be prevented when the tooth is inserted into the tooth insertion hole.

According to the electrical insulator of this aspect, the tooth can be easily inserted into the tooth insertion hole, and the electrical insulator is restrained (prevented, restricted, blocked) from moving relative to the tooth.

The number and the arrangement positions of the third and fourth projections included in the second set may be appropriately changed.

In another aspect of the electrical insulator, the second set of the projections may include at least two third projections formed apart from each other in the axial direction on the third inner wall surface and at least one fourth projection formed on the fourth inner wall surface. Alternatively, the second set of the projections may include at least one third projection formed on the third inner wall surface and at least two fourth projections formed apart from each other in the axial direction on the fourth inner wall surface.

In another aspect of the electrical insulator, the at least one fourth projection may be formed (defined) between the at least two third projections in the axial direction. Alternatively, the at least one third projection may be formed (defined) between the at least two fourth projections in the axial direction.

In another aspect of the electrical insulator, the at least one fourth projection may be formed (defined) in the center of the fourth inner wall surface in the axial direction, and the at least two third projections may be formed (defined) at an equal distance from the at least one fourth projection in the axial direction. Alternatively, the at least one third projection may be formed (defined) in the center of the third inner wall surface in the axial direction, and the at least two fourth projections may be formed (defined) at an equal distance from the at least one third projection in the axial direction.

In another aspect of the electrical insulator, the second set of the projections may include at least two third projections formed (defined) on the third inner wall surface and at least two fourth projections formed (defined) on the fourth inner wall surface.

In another aspect of the electrical insulator, the at least two third projections and the at least two fourth projections are formed at positions facing each other in the circumferential direction.

In another aspect of the electrical insulator, the at least two third projections may be formed (defined) at an equal axial distance from the center of the third inner wall surface, and the at least two fourth projections may be formed (defined) at an equal axial distance from the center of the fourth inner wall surface.

In another aspect of the electrical insulator, the projections may include the first set of projections and the second set of projections. Specifically, the projections may include the first set of projections that includes at least one first projection and at least one second projection, and the second set of projections that includes at least one third projection and at least one fourth projection.

In this aspect, the electrical insulator is restrained (prevented, restricted, blocked) from moving relative to the tooth by abutment between the first and second outer wall surfaces of the tooth and the first and second projections of the electrical insulator and by abutment between the third and fourth outer wall surfaces of the tooth and the third and fourth projections of the electrical insulator.

According to this aspect, the electrical insulator is more reliably restrained (prevented, restricted, blocked) from moving relative to the tooth.

According to the electrical insulator of this aspect, the contact area between the first and second outer wall surfaces respectively formed (defined) on the first and second sides of the tooth in the axial direction and the first and second projections respectively formed (defined) on the first and second sides of the electrical insulator in the axial direction can be reduced a compared with (to) the above-described prior art. Therefore, the tooth can be easily inserted into the tooth insertion hole.

In another aspect of the electrical insulator, the projections may include at least the first set of projections. In other words, the projections may include the at least one first projection and at least one second projection. In addition or in the alternative, the projections may include at least the second set of projections.

According to this aspect, the electrical insulator is restrained (prevented, restricted, blocked) from moving relative to the tooth by abutment between the first and second outer wall surfaces respectively formed on the first and second sides of the tooth in the axial direction and the first and second projections respectively formed on the first and second sides of the electrical insulator in the axial direction.

According to the electrical insulator of this aspect, the contact area between the first and second outer wall surfaces of the tooth and the first and second projections of the electrical insulator is smaller than the (substantially planar) contact area between the first and second outer wall surfaces of the tooth and the first and second inner wall surfaces of the electrical insulator in the prior art. Therefore, the tooth can be easily inserted into the tooth insertion hole.

According to the electrical insulator of this aspect, when the tooth is inserted into the tooth insertion hole, the load applied in the radial direction to the first and second outer wall surfaces of the tooth is reduced. Thus, deformation of the electromagnetic steel sheets arranged (located) on the first and second sides of the tooth in the axial direction can be prevented.

The number and the arrangement positions of the first and second projections of the first set can be appropriately changed.

In another aspect of the electrical insulator, the at least one third projection and the at least one fourth projection may extend in the radial direction or the axial direction, and the at least one first projection and the at least one second projection may extend in the radial direction or the circumferential direction.

The expression "extend(ing) in the radial direction" includes "extend(ing) parallel (or substantially parallel) to the radial direction" and "extend(ing) in a direction oblique to the radial direction". The expression "extend(ing) in the axial direction" includes "extend(ing) parallel (or substantially parallel) to the axial direction" and "extend(ing) in a direction oblique to the axial direction". The expression "extend(ing) in the circumferential direction" includes "extend(ing) parallel (or substantially parallel) to the circumferential direction" and "extend(ing) in a direction oblique to the circumferential direction".

Each of the first to fourth projections may include one continuously extending protruding part or a plurality of protruding parts spaced apart from each other.

In the state in which the at least one third projection and the at least one fourth projection included in the second set extend parallel to the radial direction, at least one of the third and fourth projections may be fitted between the laminated electromagnetic steel sheets when the tooth is inserted into the tooth insertion hole. When at least one of the third and fourth projections is fitted between the laminated electromagnetic steel sheets, the electrical insulator can be restrained (prevented, restricted, blocked) from moving relative to the tooth in the axial direction.

In another aspect of the electrical insulator, a recess may be recessed outward of the tooth insertion hole in at least one boundary selected from a group consisting of a first boundary between the first inner wall surface and the third inner wall surface, a second boundary between the first inner wall surface and the fourth inner wall surface, a third boundary between the second inner wall surface and the third inner wall surface, and a fourth boundary between the second inner wall surface and the fourth inner wall surface.

The electromagnetic steel sheets that constitute the tooth (teeth) may be formed, e.g., by punching electromagnetic steel sheet base materials. At this time, burrs may be formed on the electromagnetic steel sheets. If the burrs formed on the electromagnetic steel sheets that constitute the tooth interfere with the first to fourth inner wall surfaces defining the tooth insertion hole, insertion of the tooth into the tooth insertion hole of the electrical insulator might be difficult.

In the electrical insulator of this aspect, at at least one of the first to fourth boundaries, a recess is formed that is configured to limit or reduce interference between the first to fourth inner wall surfaces and burrs formed on the tooth (specifically, the electromagnetic steel sheets that constitutes the tooth). For example, the recess may be configured to receive (accommodate) burrs formed on the tooth. The position at which the recess is formed is determined according to the position of the burr(s) that may be formed on the tooth.

According to the electrical insulator of this aspect, the tooth can be easily inserted into the tooth insertion hole even if one or more burrs is/are present on the tooth.

A second aspect of the present disclosure relates to a motor.

Such a motor includes a stator and a rotor.

The stator includes a stator core, electrical insulators and a stator winding.

The stator core is tubularly formed of electromagnetic steel sheets laminated in an axial direction. The stator core has a yoke extending in a circumferential direction and teeth extending inward in the radial direction from the yoke.

Electrical insulators are respectively fitted onto the teeth.

The stator winding is wound around the electrical insulators fitted onto the teeth.

The above-described electrical insulator (of the first aspect) is used as each of the electrical insulators of the second embodiment.

Such a motor has the same effect as the above-described electrical insulator (of the first embodiment).

A third aspect of the present disclosure relates to a compressor.

Such a compressor includes a compression mechanism part for compressing a working medium (e.g., a gas such as a refrigerant) and a motor for driving the compression mechanism part. The above-described motor (of the first aspect) is used as the motor.

Such a compressor has the same effect as the above-described electrical insulator (of the first embodiment).

In the electrical insulator, the motor and the compressor of the present disclosure, the tooth can be easily inserted into the tooth insertion hole of the electrical insulator, and the electrical insulator is restrained (prevented, restricted, blocked) from moving relative to the tooth.

DETAILED DESCRIPTION

A representative embodiment according to the present disclosure will be described with reference to the drawings.

In this description, an extending direction (X direction) of a rotor center line P (rotational axis) (see FIGS. 1 and 2) of a rotor (rotor core), in the state in which the rotor is rotatably disposed relative to a stator, is referred to as an "axial direction". The rotor center line P of the rotor corresponds to the stator center line P of the stator (stator core).

A circumferential direction (Y direction) around the stator center line (rotor center line) P, as viewed from one side in the axial direction, is referred to as a "circumferential direction". An extending direction (Z direction) of a line passing through the stator center line P, as viewed from the one side in the axial direction, is referred to as a "radial direction". An "inner side in the radial direction" or "inward in the radial direction" means the stator center line P side (Z1 side) in the radial direction, and an "outer side in the radial direction" or "outward in the radial direction" means the opposite side (Z2 side) from the stator center line P in the radial direction.

As for the electrical insulator, the terms the "axial direction", the "circumferential direction" and the "radial direction" respectively mean the "axial direction", the "circumferential direction" and the "radial direction" in the state in which the electrical insulator is mounted to (on) the stator (specifically, fitted to (on) the tooth).

Figure 1:
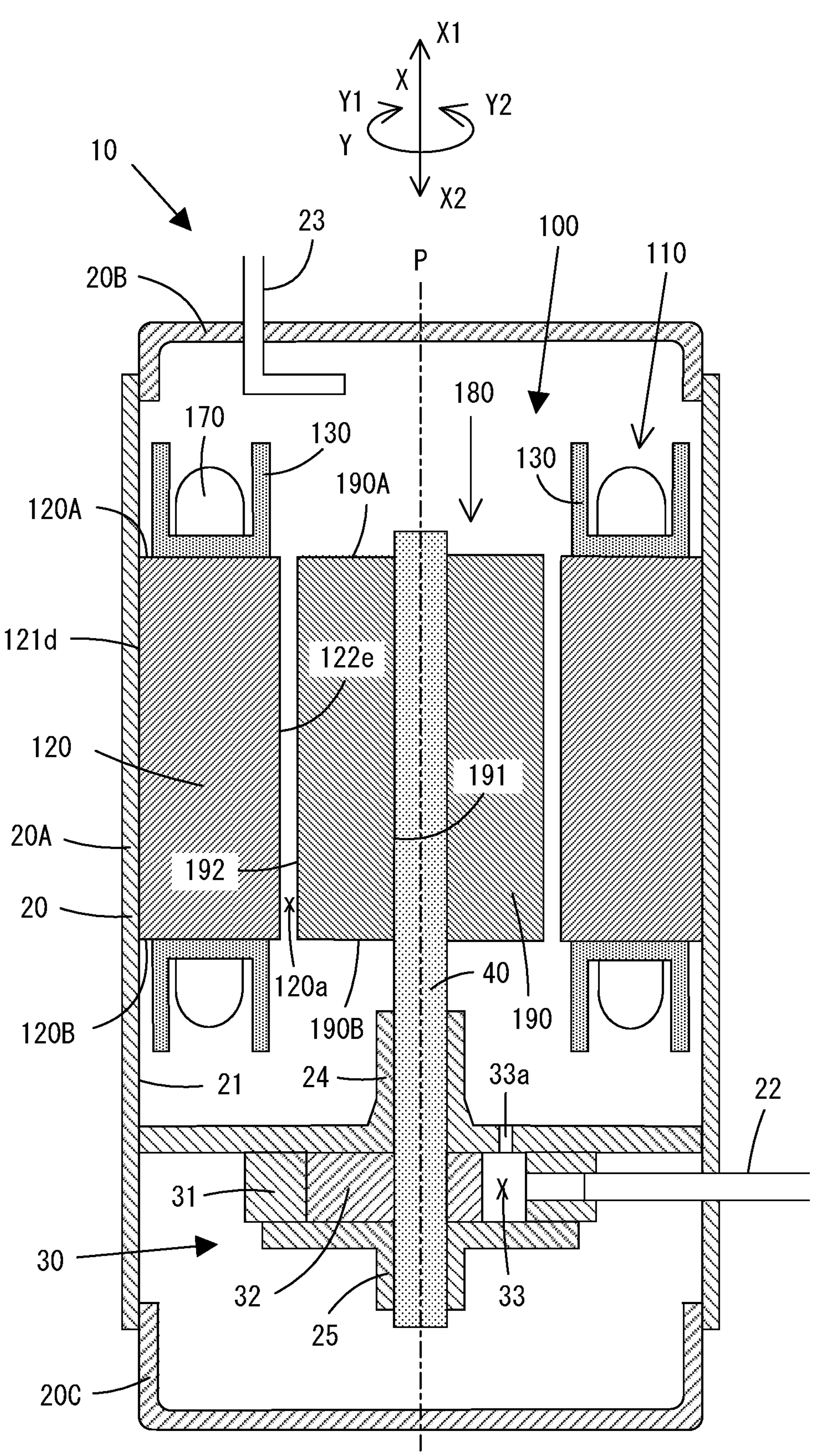
FIG. 1 is a sectional elevational view of a first embodiment of a compressor according to the present disclosure.

Furthermore, the upper side of the paper in FIG. 1 (and the upper side of the paper in FIG. 2) is called a "first side in the axial direction" (X1 side) and the lower side of the paper in FIG. 1 (and the lower side of the paper in FIG. 2) is called a "second side in the axial direction".

As viewed from the upper side of the paper in FIG. 1 (and the upper side of the paper in FIG. 2), a clockwise side (Y1 direction side) and a counterclockwise side (Y2 direction side) in the circumferential direction around the stator center line P, are respectively called a "first side in the circumferential direction" and a "second side in the circumferential direction".

Of course, the "first side in the axial direction" and the "second side in the axial direction" may be defined in reverse, and the "first side in the circumferential direction" and the "second side in the circumferential direction" may be defined in reverse.

A first representative, non-limiting embodiment of a compressor of the present disclosure will be described with reference to FIG. 1. FIG. 1 is a sectional view showing a schematic configuration of a compressor 10 according to one embodiment of the present disclosure.

The compressor 10 includes a closed housing 20 and a compression mechanism part 30 and a motor 100 that are housed in the closed housing 20.

The closed housing 20 includes a tubular body part 20A, and a lid part 20B and a bottom part 20C that are mounted respectively on one side and the other side of the body part 20A in the axial direction.

The closed housing 20 is provided with a suction intake pipe 22 and a discharge pipe 23.

The compression mechanism part 30 compresses a working medium (such as a "refrigerant" or a "coolant") for transferring thermal energy. For example, an HFC (hydrofluorocarbon) refrigerant may be used as the working medium.

The compression mechanism part 30 includes a cylinder 31, an eccentric rotor 32 that is rotated by a rotary shaft 40, and a compression chamber 33. The rotary shaft 40 is rotatably supported by bearings 24, 25. When the eccentric rotor 32 is rotated by rotation of the rotary shaft 40, the working medium drawn through the suction intake pipe 22 is compressed within the compression chamber 33. Then, the compressed working medium is discharged from the discharge pipe 23 via an outlet port **33*a* and a passage provided in the motor 100**.

In FIG. 1, the compression mechanism part 30 and the motor 100 are arranged one above the other in a vertical direction. That is, the compressor 10 shown in FIG. 1 is configured as a vertical compressor.

In FIG. 1, although the motor 100 is arranged (disposed) above the compression mechanism part 30 (on the first side in the axial direction), it can instead be arranged (disposed) below the compression mechanism part 30 (on the second side in the axial direction).

Alternatively, the compression mechanism part 30 and the motor 100 can also be arranged side by side in a horizontal direction. That is, the compressor 10 can be configured as a horizontal compressor. In this case, the arrangement positions of the compression mechanism part 30 and the motor 100 in the horizontal direction may be appropriately changed.

The motor 100 includes a stator 110 and a rotor 180.

The stator 110 includes a stator core 120, a plurality of electrical insulators 130 and a stator winding (coils) 170.

The stator core 120 (described in detail below) is formed of a plurality of electromagnetic steel sheets laminated (stacked) in the axial direction.

The stator core 120 has a tubular shape and has stator core end surfaces 120A and 120B respectively formed on the first and second sides in the axial direction. Furthermore, the stator core 120 has a stator core inner peripheral surface (tooth inner peripheral surface 122*e* that is described below) and a stator core outer peripheral surface (yoke outer peripheral surface 121*d* that is described below). A stator core interior space 120*a* is defined by the stator core inner peripheral surface (the tooth inner peripheral surface 122*e*).

The stator core 120 has a yoke 121 extending in the circumferential direction and a plurality of teeth 122 each of which extends inward in the radial direction from the yoke 121.

Each of the electrical insulators 130 (described in detail below) is fitted onto one of the teeth 122 of the stator core 120 so as to surround the respective tooth 122.

The stator winding 170 (specifically, one or more lead wires forming the stator winding 170) is wound around each of the electrical insulators 300. That is, in all embodiments of the present disclosure, the stator winding 170 may be a single continuous piece of wire that is wound around all of the electrical insulators without a break or may be a plurality of individual (discrete, separate) pieces of wire that are respectively wound around the electrical insulators and then electrically connected to each other as appropriate to supply electric current to each of the stator windings 170.

The rotor 180 includes a rotor core 190 and the rotary shaft 40.

The rotor core 190 is formed of a plurality of electromagnetic steel sheets laminated (stacked) in the axial direction. The rotor core 190 has a tubular shape and has rotor core end surfaces 190A and 190B respectively formed on the first and second sides in the axial direction. Furthermore, the rotor core 190 has a rotor core inner peripheral surface 191 and a rotor core outer peripheral surface 192. The rotor core 190 is rotatably disposed within the stator core interior space 120*a*.

The rotary shaft 40 is inserted by press-fitting or the like into a rotor core interior space defined by the rotor core inner peripheral surface 191.

The motor 100 corresponds to one embodiment of a motor according to the present disclosure.

The stator 110 corresponds to one embodiment of a stator according to the present disclosure.

The stator core 120 corresponds to a first embodiment of a stator core according to the present disclosure.

The (each) electrical insulator 130 corresponds to a first embodiment of an electrical insulator according to the present disclosure.

Next, the structure of the stator 110 will be described with reference to FIGS. 2 to 7.

Figure 2:
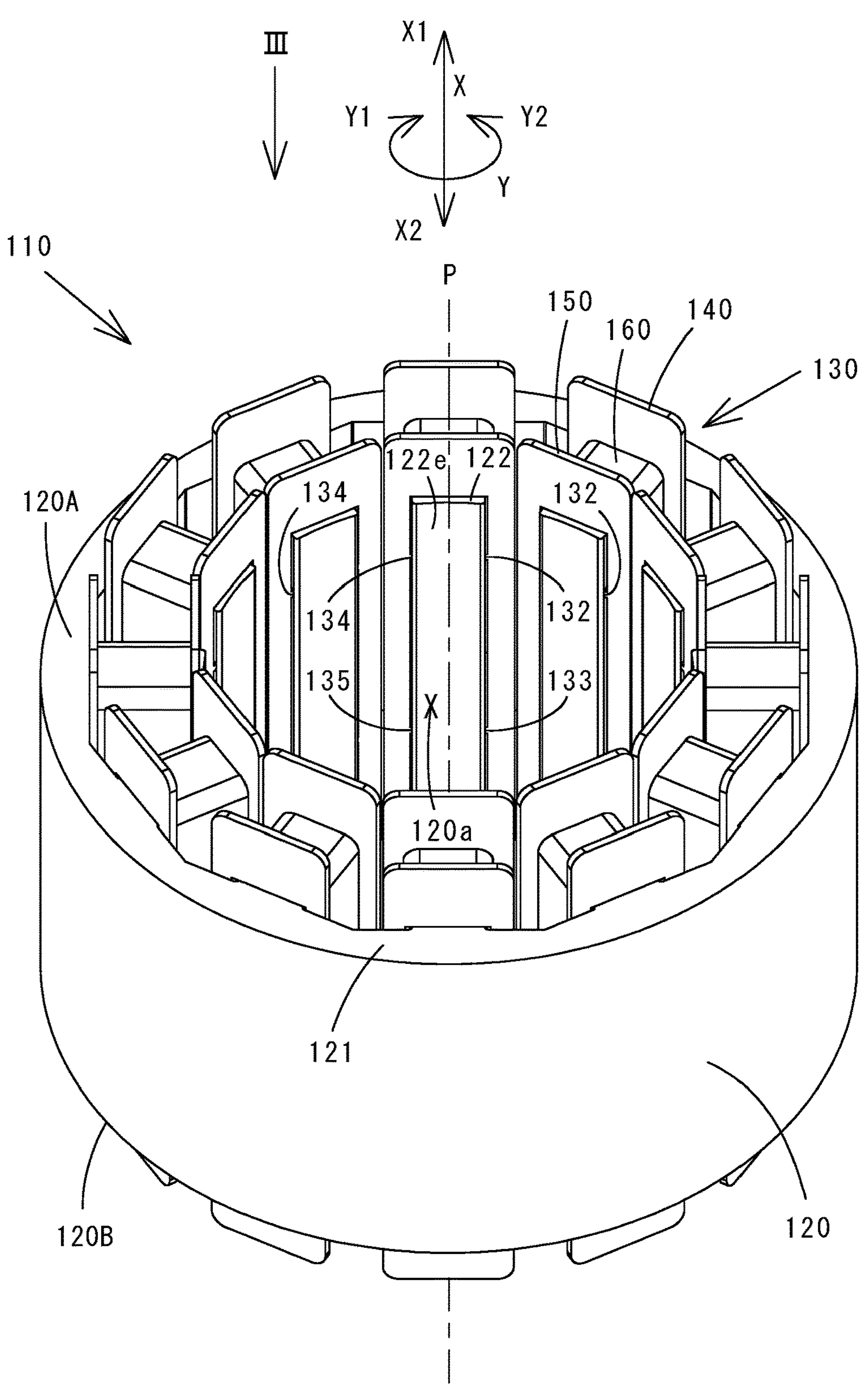
FIG. 2 is a perspective view of a first embodiment of a stator usable in a motor of the compressor of FIG. 1.
Figure 3:
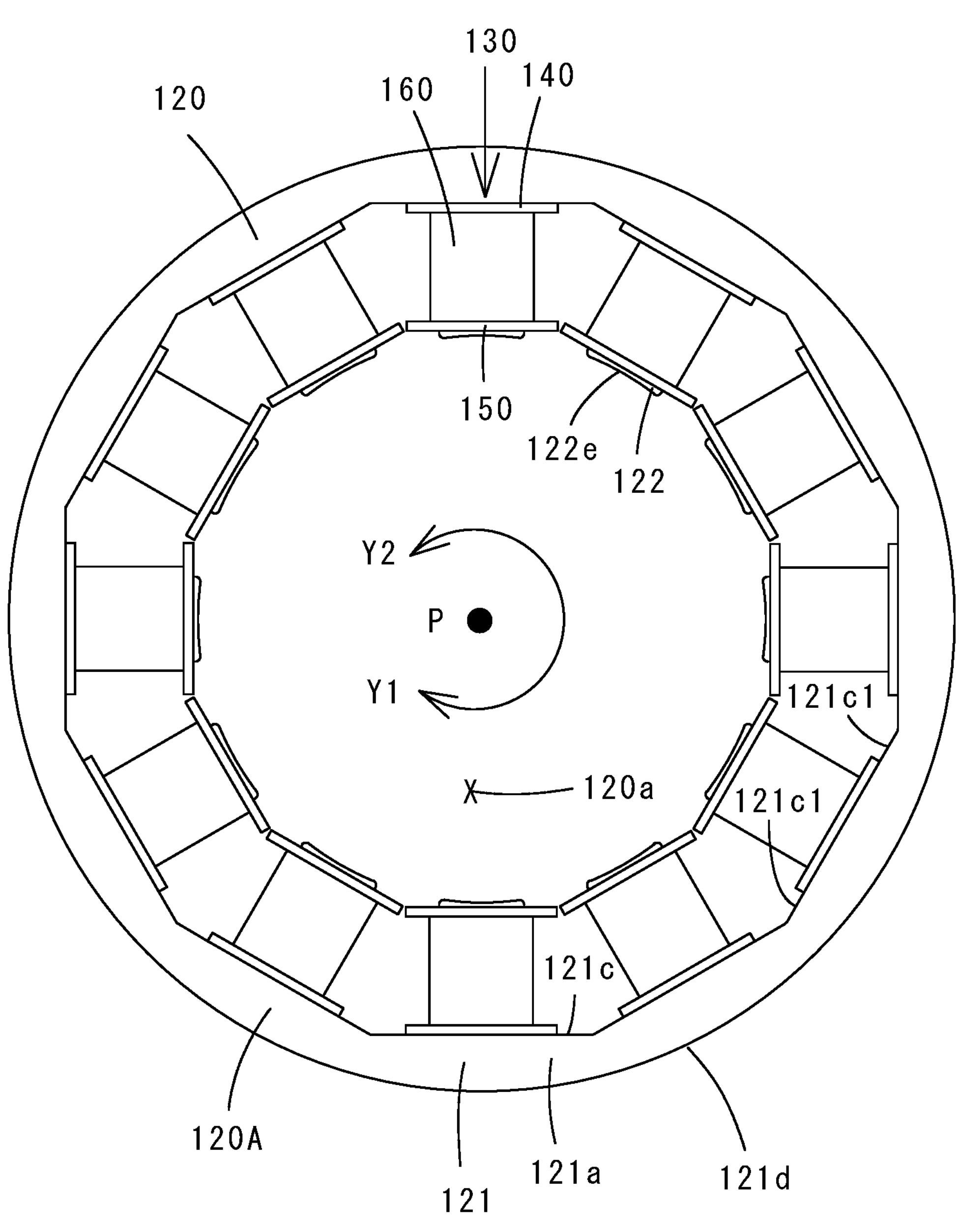
FIG. 3 is a view of the stator of FIG. 2 in the direction of arrow III in FIG. 2.

The stator 110 includes the stator core 120, a plurality of the electrical insulators 130 and the stator winding 170. In FIGS. 2 and 3, the stator winding 170 is not shown in order to provide a clear view of the assembled state of the electrical insulators 130 to (on) the stator core 120.

Figure 4:
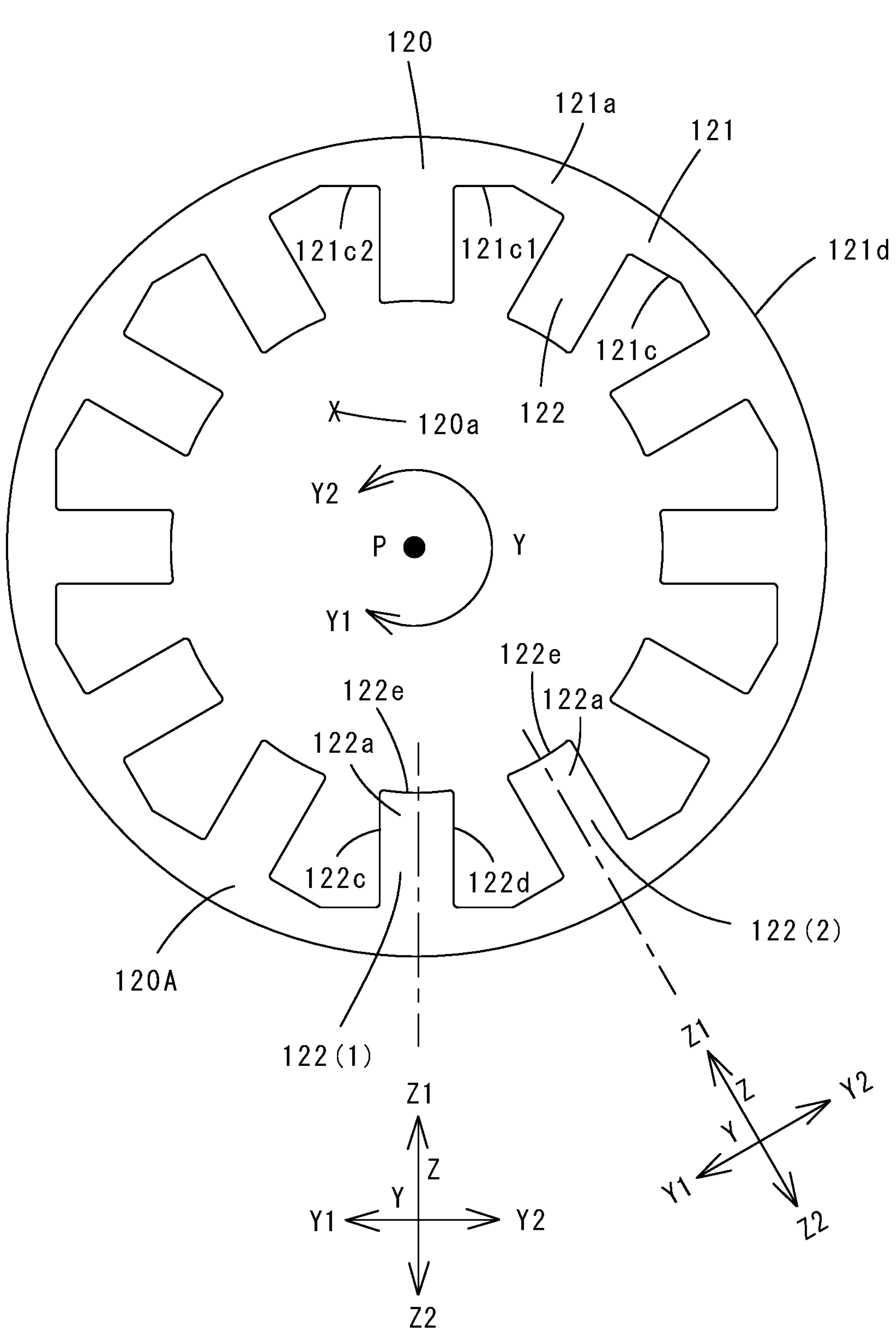
FIG. 4 is a top plan view of a first embodiment of a stator core usable in the stator of FIG. 2.

First, the structure of the stator core 120 will be described with reference to FIG. 4. FIG. 4 is a plan view of the stator core 120.

The stator core 120 comprises the yoke 121 and a plurality of the teeth 122.

The yoke 121 extends in the circumferential direction. The yoke 121 has upper and lower yoke end surfaces respectively formed on the first side and the second side in the axial direction (that is, the upper yoke part end surface 121*a* is shown in FIG. 4; the lower yoke part end surface is on the opposite side of the yoke part 121 in the X direction), a yoke inner peripheral surface 121*c* and a yoke outer peripheral surface 121*d*. The yoke inner peripheral surface 121*c* extends along sides of a regular polygon, the number of the sides corresponding to the number of the teeth 122. In this embodiment, the yoke inner peripheral surface 121*c* extends along sides of a regular dodecagon (the number of teeth=12). Furthermore, in this embodiment, the yoke inner peripheral surface 121*c* includes yoke inner peripheral surface portions 121*cl* each formed on the first side of the tooth 122 in the circumferential direction and yoke inner peripheral surface portions 121*c*2 each formed on the second side of the tooth 122 in the circumferential direction. The yoke outer peripheral surface 121*d* extends along a circle centered on the stator center line P.

The teeth 122 are arranged at equal intervals in the circumferential direction and extend inward in the radial direction from the yoke 121. Each of the teeth 122 has upper and lower tooth end surfaces respectively formed on the first side and the second side in the axial direction (that is, the upper tooth part end surface 122*a* is shown in FIG. 4; the lower tooth part end surface is on the opposite side of the tooth part 122 in the X direction), a tooth side surface 122*c* formed on the first side in the circumferential direction, a tooth side surface 122*d* formed on the second side in the circumferential direction, and a tooth inner peripheral surface 122*e* formed on the inner side in the radial direction. The tooth end surfaces 122*a*, 122*b* extend in the radial direction and the circumferential direction. The tooth side surfaces 122*c*, 122*d* extend in the radial direction and the axial direction. The tooth inner peripheral surface 122*e* extends along an arc centered on the stator center line P. The stator core interior space 120*a* is defined by the tooth inner peripheral surfaces 122*e*.

The extending direction of the (each) tooth 122 in the radial direction corresponds to the extending direction of a center line of the (each) tooth 122. Therefore, the extending direction of the (each) tooth 122 in the radial direction is different for each tooth 122. For example, as shown in FIG. 4, the extending direction of a tooth 122(1) in the radial direction is different from that of a tooth 122(2). The same applies to the extending direction of the electrical insulator 130 in the radial direction that is fitted onto the respective tooth 122(1), 122(2).

The upper yoke end surface 121*a* and the tooth end surfaces 122*a* form the stator core end surface 120A on the first side in the axial direction, and the lower yoke end surface and the tooth end surfaces 122*b* form the stator core end surface 120B on the second side in the axial direction.

Slots (gaps) are respectively defined between each pair of two teeth that are adjacent to each other in the circumferential direction.

In the stator core 120 of this embodiment, the tooth end surface 122*a*, the tooth end surface 122*b*, the tooth side surface 122*c* and the tooth side surface 122*d* of the tooth 122 correspond to the “first outer wall surface”, the “second outer wall surface”, the “third outer wall surface” and the “fourth outer wall surface” of a tooth of the present disclosure, respectively.

Figure 6:
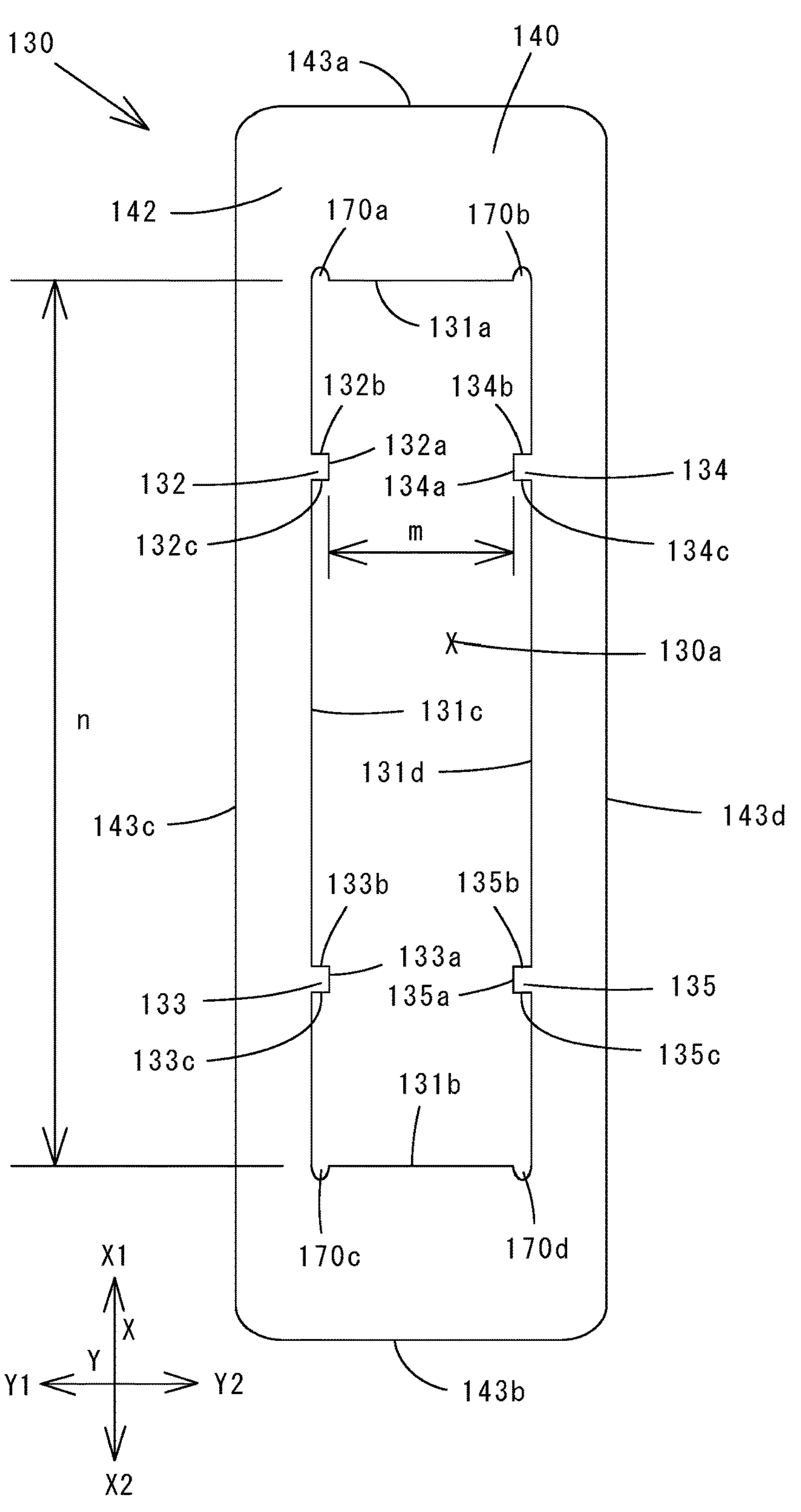
FIG. 6 is a view of the electrical insulator of FIG. 5 in the direction of arrow VI in FIG. 5.
Figure 7:
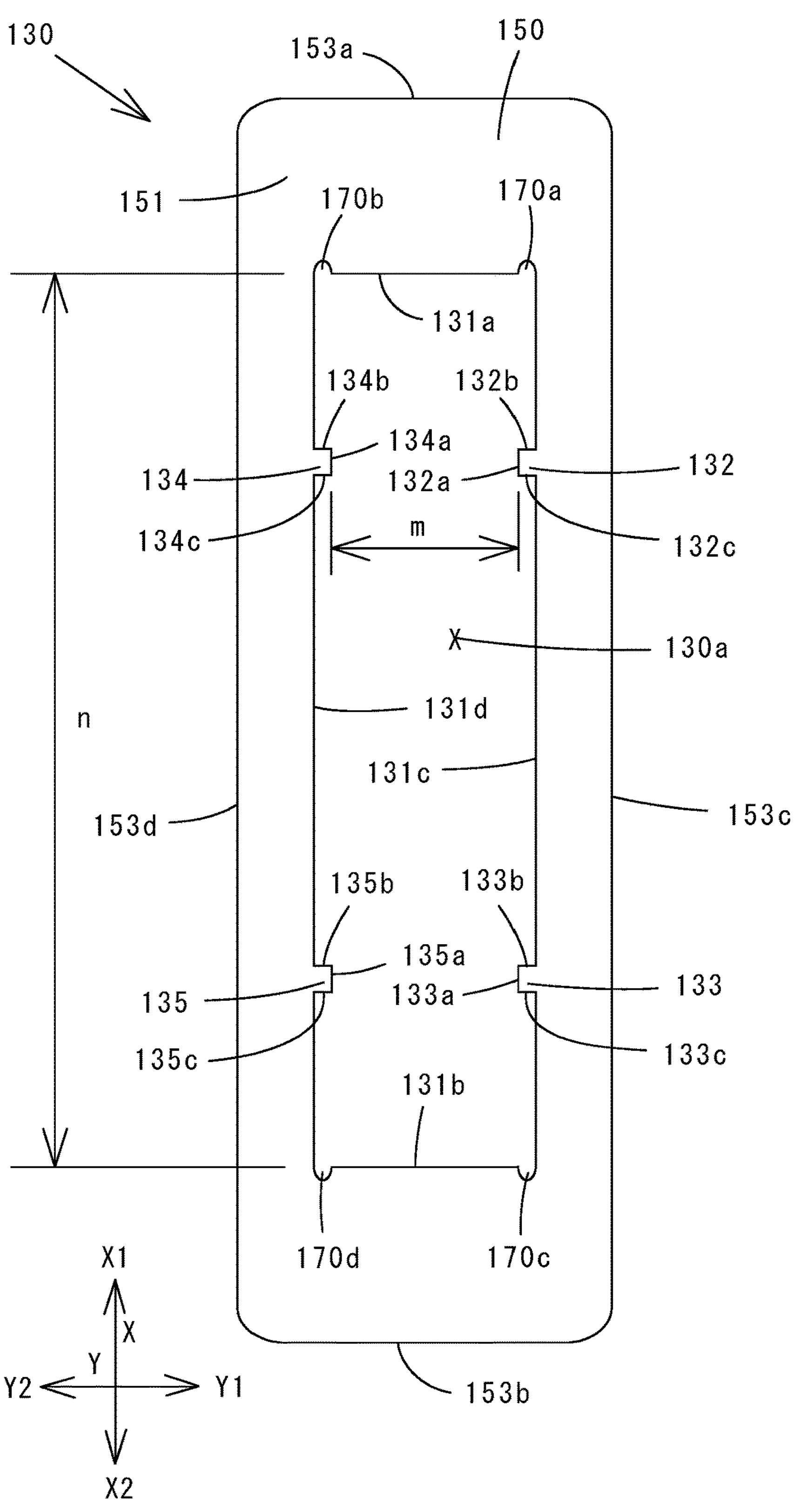
FIG. 7 is a view of the electrical insulator of FIG. 5 in the direction of arrow VII in FIG. 5.

Next, the structure of the electrical insulator 130 will be described with reference to FIGS. 5 to 7.

Figure 5:
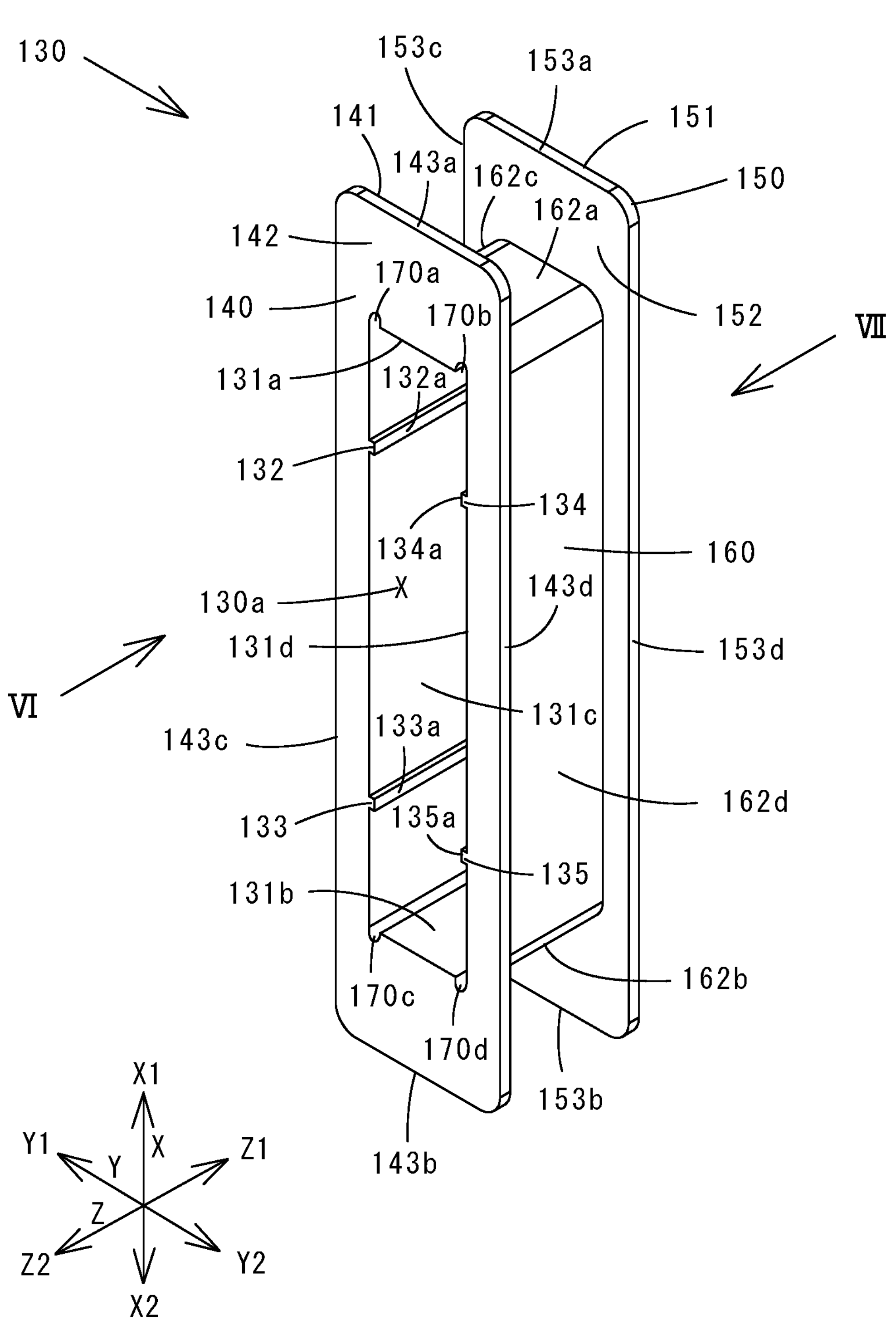
FIG. 5 is a perspective view of a first embodiment of an electrical insulator attachable to the stator core of FIG. 4.

FIG. 5 is a perspective view of the electrical insulator 130. FIG. 6 is a view as viewed from (along) a direction of arrow VI in FIG. 5, and FIG. 7 is a view as viewed from (along) a direction of arrow VII in FIG. 5.

The electrical insulator 130 is formed of resin (polymer) having electrical insulating properties, such as, e.g., a polymer comprising at least 30 mass %, preferably at least 50 mass %, optionally at least 90 mass %, of one of polybutylene terephthalate (PBT), polyphenylene sulfide (PPS), liquid crystal polymer (LCP), syndiotactic polystyrene (SPS) or nylon (polyamide).

The electrical insulator 130 may also be called the "resin bobbin", the "polymer bobbin", or the "coil bobbin".

The electrical insulator 130 has a first flange part 140, a second flange part 150 and a body part 160.

The first flange part 140 extends in the axial direction and the circumferential direction.

The first flange part 140 has an end surface 141 on the inner side in the radial direction and an end surface 142 on the outer side in the radial direction.

Furthermore, the first flange part 140 has an outer wall surface 143*a* on the first side in the axial direction, an outer wall surface 143*b* on the second side in the axial direction, an outer wall surface 143*c* on the first side in the circumferential direction and an outer wall surface 143*d* on the second side in the circumferential direction.

The second flange part 150 is disposed radially inward of the first flange part 140 and extends in the axial direction and the circumferential direction.

The second flange part 150 has an (a first) end surface 151 on its radially inner (Z1) side and an (a second) end surface 152 on its radially outer (Z2) side.

Furthermore, the second flange part 150 has an (a first) outer wall surface 153*a* on the first (X1) side in the axial direction, an (a second) outer wall surface 153*b* on the second (X2) side in the axial direction, an (a third) outer wall surface 153*c* on the first (Y1) side in the circumferential direction and an (a fourth) outer wall surface 153*d* on the second (Y2) side in the circumferential direction.

The body part 160 is formed (extends) between the first and second flange parts 140, 150 and extends in the radial direction.

The body part 160 has a through hole 130*a* extending in the radial direction.

The through hole 130*a* is open to (opens at) the end surface 142 of the first flange part 140 and the end surface 151 of the second flange part 150. An inner wall that defines the through hole 130*a* includes a first inner wall surface 131*a* and a second inner wall surface 131*b* formed on first and second sides of the hole in the axial direction and a third inner wall surface 131*c* and a fourth inner wall surface 131*d* formed on the third and fourth sides of the hole in the circumferential direction. The inner wall surfaces 131*a* and 131*b* extend in the radial direction and the circumferential direction. The inner wall surfaces 131*c* and 131*d* extend in the radial direction and the axial direction. When the tooth 122 is inserted into the through hole 130*a*, the inner wall surfaces 131*a*, 131*b*, 131*c* and 131*d* face (oppose) the tooth surfaces 122*a*, 122*b*, 122*c* and 122*d* respectively.

At least one projection is formed on the inner wall of the through hole 130*a* and protrudes into the through hole 130*a*. Preferably, at least two projections are formed on the inner wall of the through hole 130*a*.

In this embodiment, two projections 132, 133 are formed (disposed) spaced apart from each other in the axial direction on the third inner wall surface 131*c*, and two projections 134, 135 are formed (disposed) spaced apart from each other in the axial direction on the fourth inner wall surface 131*d*.

Each of the projections 132, 133, 134 and 135 is a single protruding part (rib or ridge) having a uniform (constant) rectangular cross-section along the radial direction and a length direction extending parallel (or substantially parallel) to the radial direction.

The projection 132 (133) has an outer wall surface 132*a* (133*a*) on the second side in the circumferential direction, an outer wall surface 132*b* (133*b*) on the first side in the axial direction and an outer wall surface 132*c* (133*c*) on the second side in the axial direction.

The projection 134 (135) has an outer wall surface 134*a* (135*a*) on the first side in the circumferential direction, an outer wall surface 134*b* (135*b*) on the first side in the axial direction and an outer wall surface 134*c* (135*c*) on the second side in the axial direction.

In this embodiment, the electrical insulator 130 has a second set of projections. The second set of projections includes projections each protruding from the inner wall into the through hole in the circumferential direction. In this embodiment, the second set of projections includes the projections 132, 133 formed on the third inner wall surface 131*c* and the projections 134, 135 formed on the fourth inner wall surface 131*d*.

In the state in which the tooth 122 is inserted into the through hole 130*a*, the electrical insulator 130 is restrained (prevented, restricted, blocked) from moving relative to the tooth 122 by abutment of the tooth side surface 122*c* on the outer wall surface 132*a* of the projection 132 and the outer wall surface 133*a* of the projection 133 and abutment of the tooth side surface 122*d* on the outer wall surface 134*a* of the projection 134 and the outer wall surface 135*a* of the projection 135.

In this embodiment, the projections 132, 133 are formed (provided, disposed) at an equal distance from a center of the inner wall surface 131*c* in the axial direction, and the projections 134, 135 are formed (provided, disposed) at an equal distance from a center of the inner wall surface 131*d* in the axial direction. Furthermore, the projections 132 and 133 and the projections 134 and 135 are formed (provided, disposed) at positions facing each other in the circumferential direction. Thus, the (each) electrical insulator 130 is stably held on the (each) tooth 122.

The distance from the center of the inner wall surface 131*c* (131*d*) in the axial direction to the projections 132 and 133 (134 and 135) can be appropriately set.

In the state in which the projections 132, 133, 134 and 135 included in the second set extend parallel (or substantially parallel) to the radial direction, any of the projections 132, 133, 134 or 135 may be fitted (interleaved) between the laminated electromagnetic steel sheets constituting the stator core 120 when the tooth 122 is inserted into the through hole 130*a*. When any of the projections 132, 133, 134 and 135 is fitted (interleaved) between the laminated electromagnetic steel sheets, the electrical insulator 130 is prevented (blocked, restrained, restricted) from moving relative to the tooth 122 in the axial direction.

In the above description, two projections 132, 133 are formed spaced apart from each other in the axial direction on the inner wall surface 131*c* (131*d*), but only one projection or three or more projections may instead be formed.

Generally, the yoke 121 and the tooth 122 of the stator core 120 are formed (composed) of electromagnetic steel sheets that are formed (shaped) by punching electromagnetic steel sheet base materials. When the electromagnetic steel sheets having the tooth 122 are formed by punching electromagnetic steel sheet base materials, one or more burrs may be formed on edge(s) of the electromagnetic steel sheets.

If one or more burr(s) is/are formed on one or more of the teeth 122 (specifically, on the electromagnetic steel sheets having the teeth 122), the inner wall surfaces 131*a* to 131*d* defining the through hole 130*a* may interfere with the burr(s) formed on one or more of the teeth 122 when the tooth or teeth 122 is (are respectively) inserted into the through hole (through holes) 130*a* of the electrical insulator(s) 130. If the inner wall surfaces 131*a* to 131*d* interfere with the burr(s) formed on the tooth 122 (i.e. the burr(s) block(s) or impede (s) movement of the electrical insulator 130 along the side of the tooth 122), it becomes difficult to insert the tooth 122 into the through hole 130*a*.

To avoid such a potential problem, in the electrical insulator of the present disclosure, recesses (grooves, channels) are formed at positions facing parts of the tooth 122 on which one or more burrs tend to be formed.

More specifically, the electrical insulator 130 of this embodiment has recesses 170*a*, 170*b*, 170*c*, 170*d* recessed outward of the through hole 130*a*. The recess 170*a* is a groove that is formed in (at) a boundary between the inner wall surfaces 131*a* and 131*c* and extends in the radial direction. The recess 170*b* is a groove that is formed in (at) a boundary between the inner wall surfaces 131*a* and 131*d* and extends in the radial direction. The recess 170*c* is a groove that is formed in (at) a boundary between the inner wall surfaces 131*b* and 131*c* and extends in the radial direction. The recess 170*d* is a groove that is formed in (at) a boundary between the inner wall surfaces 131*b* and 131*d* and extends in the radial direction.

The recesses 170*a*, 170*b*, 170*c* and 170*d* are configured (shaped) to avoid or at least reduce the likelihood of interference between the inner wall surfaces 131*a* to 131*d* and any burr(s) formed on the tooth 122 when the tooth 122 is inserted into the through hole 130*a*. For example, the recesses 170*a* to 170*d* are configured to be able to receive (accommodate) any burr(s) formed on edges (e.g., corners) of the tooth 122.

The electrical insulator 130 of this embodiment has the recesses 170*a*, 170*b*, 170*c*, 170*d*, so that the tooth 122 can be easily inserted into the through hole 130*a* even if one or burrs are present on the tooth 122 that is being inserted into the through hole 130*a*.

In the electrical insulator 130 shown in FIG. 5, a recess is formed in (at) each of the four boundaries, but a recess may only be formed in (at) a boundary facing any part of the tooth 122 on which burr(s) tend to be formed. In other words, the recess may be formed in (at) at least one boundary.

The shape of the recesses 170*a*, 170*b*, 170*c*, 170*d* can be selected according to the shape of burrs that tend to be formed on the tooth 122 in the particular manufacturing process utilized to prepare the steel sheets that will be laminated together to form the stator core 120.

The body part 160 has an outer wall surface 162*a* formed (defined) on the first side in the axial direction, an outer wall surface 162*b* formed (defined) on the second side in the axial direction, an outer wall surface 162*c* formed (defined) on the first side in the circumferential direction and an outer wall surface 162*d* formed (defined) on the second side in the circumferential direction.

The first flange part 140 and second flange part 150 are formed so as to protrude from the outer wall surfaces 162*a*, 162*b*, 162*c*, 162*d* of the body part 160. Thus, a space for winding the stator winding 170 (specifically, a lead wire forming the stator winding 170) is defined by the first flange part 140, the second flange part 150 and the outer wall surfaces 162*a* to 162*d* of the body part 160.

Various methods may be used to wind the stator winding 170 around the electrical insulator 130. For example, the stator winding 170 may be wound around the electrical insulator 130 before the electrical insulator 130 is fitted onto the tooth 122, or the stator winding 170 may be wound around the electrical insulator 130 after the electrical insulator 130 has been fitted onto the tooth 122.

In the electrical insulator 130 of this embodiment, the through hole 130*a* corresponds to a "tooth insertion hole" according to the present disclosure.

Furthermore, the inner wall surfaces 131*a*, 131*b*, 131*c* and 131*d* of the through hole 130*a* correspond to a "first inner wall surface", a "second inner wall surface", a "third inner wall surface" and a "fourth inner wall surface" according to the present disclosure, respectively.

Furthermore, the projections 132, 133 correspond to an "at least one third projection formed on the third inner wall surface" and/or an "at least two third projections formed on the third inner wall surface", and the projections 134, 135 correspond to an "at least one fourth projection formed on the fourth inner wall surface" and/or an "at least two fourth projections formed on the fourth inner wall surface" according to the present disclosure, respectively.

The projections 132, 133 and the projections 134, 135 constitute a "second set of projections" according to the present disclosure.

Furthermore, the boundary between the inner wall surfaces 131*a* and 131*c* corresponds to a "first boundary", the boundary between the inner wall surfaces 131*a* and 131*d* corresponds to a "second boundary", the boundary between the inner wall surfaces 131*b* and 131*c* corresponds to a "third boundary", the boundary between the inner wall surfaces 131*b* and 131*d* corresponds to a "fourth boundary" according to the present disclosure.

Furthermore, the recesses 170*a*, 170*b*, 170*c*, 170*d* correspond to a "first recess", a "second recess", a "third recess" and a "fourth recess" according to the present disclosure, respectively.

Figure 8:
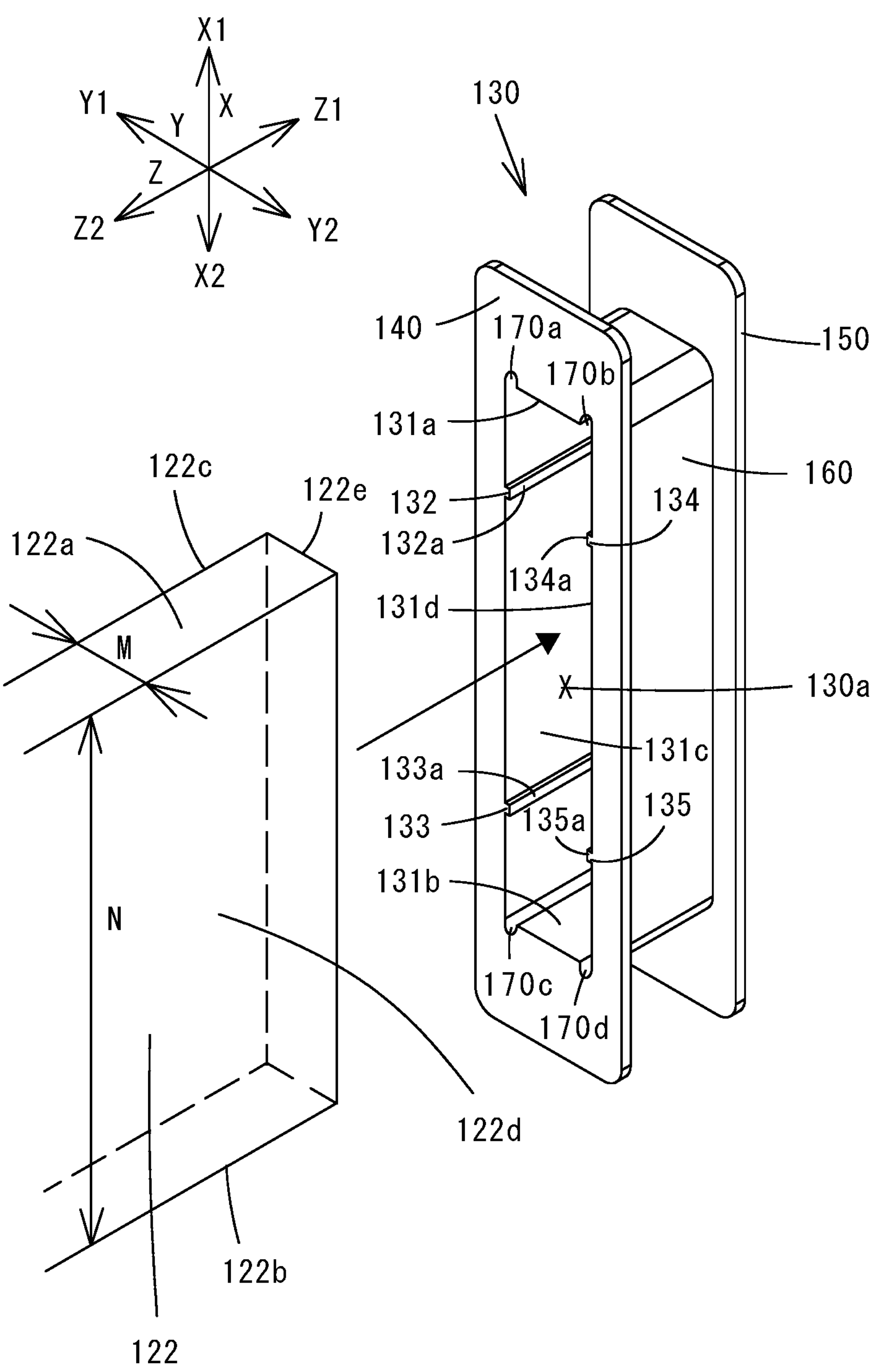
FIG. 8 is a perspective view schematically showing the first embodiment of the electrical insulator being fitted to the first embodiment of the stator core.

Next, the operation of fitting the electrical insulator 130 onto one of the teeth 122 will be described with reference to FIG. 8.

In order to fit the electrical insulator 130 onto the tooth 122, the tooth 122 is inserted into the through hole 130*a* of the electrical insulator 130 (equivalent to the electrical insulator 130 being mounted on the tooth 122). In this embodiment, the tooth inner peripheral surface 122*e* of the tooth 122 is inserted into the through hole 130*a* from the first flange part 140 side. At this time, the tooth 122 is inserted into the through hole 130*a* such that the tooth side surfaces 122*c*, 122*d* and the tooth end surfaces 122*a*, 122*b* of the tooth 122 respectively face the inner wall surfaces 131*c*, 131*d*, 131*a* and 131*b* of the through hole 130*a*.

The inner wall surfaces 131*a* to 131*d* of the through hole 130*a* may have an inclined surface that is formed on the first flange end surface 142 side and may be configured to guide the tooth 122 into the through hole 130*a*.

The tooth 122 is inserted into the through hole 130*a* such that the tooth inner peripheral surface 122*e* protrudes from the end surface 151 of the second flange part 150.

In embodiments in which the first flange part 140 and the second flange part 150 have the same shape, the tooth 122 can also be inserted into the through hole 130*a* from the second flange part 150 side.

The electrical insulator 130 of this embodiment is fitted onto the tooth 122, while being restrained (prevented, blocked, restricted) from moving relative to the tooth 122 by abutment of the tooth side surface 122*c* on the projections 132, 133 formed on the inner wall surface 131*c* and abutment of the tooth side surface 122*d* on the projections 134, 135 formed on the inner wall surface 131*d*.

Specifically, width m (see FIGS. 6 and 7) between the projections 132 and 134 (133 and 135) in the circumferential direction is set (selected) to be slightly shorter (less than width M (see FIG. 8) of the tooth 122 (the tooth end surfaces 122*a*, 122*b*)) in the circumferential direction.

The width m is set such that it is possible to insert the tooth 122 into the through hole 130*a* while achieving the effect of restraining (preventing, blocking, restricting) movement of the electrical insulator 130 relative to the tooth 122.

In this embodiment, the electrical insulator 130 is restricted (prevented, blocked, restrained) from moving in the circumferential direction relative to the tooth 122 and is restricted (prevented, blocked, restrained) from moving in the axial direction and the radial direction relative to the tooth 122 by abutment between the tooth side surface 122*c* and the projections 132, 133 and abutment between the tooth side surface 122*d* and the projections 134,135.

In this embodiment, the contact area between the tooth side surface 122*c* and the projections 132, 133 and the contact area between the tooth side surface 122*d* and the projections 134, 135 are small compared with the contact area between the tooth side surface 122*c* and the inner wall surface 131*c* and the contact area between the tooth side surface 122*d* and the inner wall surface 131*d* in the above-described prior art.

Therefore, the insertion resistance when inserting the tooth 122 into the through hole 130*a* is smaller than that of the prior art.

The force of holding the electrical insulator 130 on the tooth 122 can be increased by adjusting the height (the protruding length from the inner wall surface 131*c*) of the projections 132, 133 and the height of the projections 134, 135 (the protruding length from the inner wall surface 131*d*).

Furthermore, in this embodiment, the electrical insulator 130 is held on the tooth 122 by abutment between the tooth side surface 122*c* and the projections 132, 133 and abutment between the tooth side surface 122*d* and the projections 134, 135, so that, unlike the prior art, it is not necessary for the tooth end surface 122*a* to abut on the inner wall surface 131*a* and for the tooth end surface 122*b* to abut on the inner wall surface 131*b*.

For example, length n (see FIGS. 6 and 7) between the inner wall surface 131*a* and 131*b* in the axial direction may be set (selected) to be substantially the same as or slightly longer than length N (see FIG. 8) of the tooth 122 (between the tooth end surfaces 122*a*, 122*b*) in the axial direction.

In this case, when the tooth 122 is inserted into the through hole 130*a*, the load applied to the tooth end surfaces 122*a*, 122*b* in the radial direction is reduced.

The tooth 122 is formed (composed) of electromagnetic steel sheets laminated in the axial direction.

In this embodiment, when the tooth 122 is inserted into the through hole 130*a*, an excessive load is prevented from being applied in the plane of the electromagnetic steel sheets to the electromagnetic steel sheets arranged (disposed, located) on the first and second sides of the tooth 122 in the axial direction.

Thus, deformation of the electromagnetic steel sheets arranged on the first and second sides of the tooth 122 in the axial direction is reduced or avoided.

The electrical insulator 130 is restricted (prevented, blocked, restrained) from moving to the second side in the axial direction relative to the tooth 122 by abutment between the inner wall surface 131*a* and the tooth end surface 122*a*, and also restricted (prevented, blocked, restrained) from moving to the first side in the axial direction relative to the tooth 122 by abutment between the inner wall surface 131*b* and the tooth end surface 122*b*.

In the electrical insulator 130 of the first embodiment, two projections are formed on each of the inner wall surfaces on the first and second sides in the circumferential direction, but the number and the arrangement positions of the projections formed on the inner wall surfaces on the first and second sides in the circumferential direction are not limited to those described in the embodiment.

In the above description (in the first embodiment), the stator core 120 is composed of a single core member, but it can instead be composed of a plurality of core members, as will be further explained below with reference to a second embodiment of the present disclosure.

More specifically, a stator core 220 of the second embodiment will be described with reference to FIG. 9.

The stator core 220 of this embodiment includes a plurality of core members 225. Each of the core members 225 is composed of a plurality of electromagnetic steel sheets laminated in the axial direction.

Each of the core members 225 has a yoke part 221 extending in the circumferential direction and a tooth part 222 extending inward in the radial direction from the yoke part 221. The yoke part 221 has upper and lower yoke part end surfaces (the upper yoke part end surface 221*a* is shown in FIG. 9; the lower yoke part end surface is on the opposite side of the yoke part 221 in the X direction), a yoke part inner peripheral surface 221*c*, a yoke part outer peripheral surface 221*d* and yoke part side surfaces. The yoke part inner peripheral surface 221*c* includes a yoke part inner peripheral surface portion 221*cl* formed on the first side in the circumferential direction and a yoke part inner peripheral surface portion 221*c*2 formed on the second side in the circumferential direction. Furthermore, the yoke part side surfaces include a yoke part side surface 221*e* formed on the first side in the circumferential direction and a yoke part side surface 221*f* formed on the second side in the circumferential direction.

Figure 9:
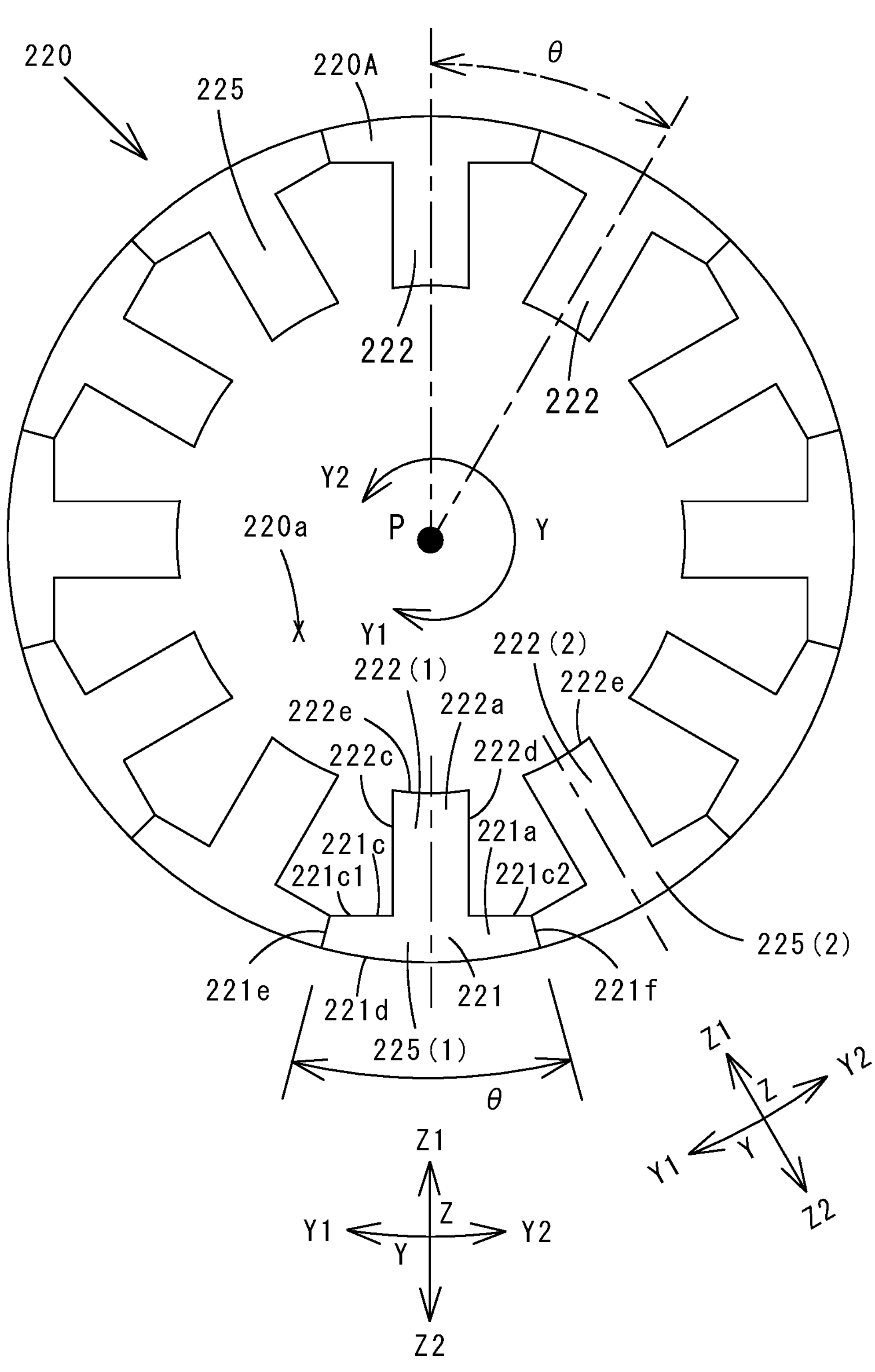
FIG. 9 is a top plan view of a second embodiment of a stator core that can be used to form a stator for use in the compressor of FIG. 1.

Each tooth part 222 has upper and lower tooth part end surfaces (the upper tooth part end surface 221*a* is shown in FIG. 9; the lower tooth part end surface is on the opposite side of the tooth part 222 in the X direction), a tooth part side surface 222*c* formed on the first side in the circumferential direction, a tooth part side surface 222*d* formed on the second side in the circumferential direction, and a tooth part inner peripheral surface 222*e* formed on the inner side in the radial direction.

The stator core 220 is formed by the core members 225 being arranged along (around) the circumferential direction. At this time, the yoke part side surface 221*e* of one of the two core members 225 adjacent to each other in the circumferential direction and the yoke part side surface 221*f* of the other of the two core member 225 are joined, for example, by welding.

The yoke part inner peripheral surfaces 221*c* (221*c*1, 221*c*2) of the core members 225 respectively extend along sides of a regular polygon, the number of sides of which corresponds to the number of the teeth 222.

The tooth part inner peripheral surface 222*e* of the core member 225 extends along an arc centered on the stator core center line P. A stator core interior space 220*a* is defined by the tooth inner peripheral surfaces 222*e* of the core members 225.

The upper yoke part end surfaces 221*a* and the upper tooth part end surfaces 222*a* of the core members 225 form the upper stator core end surface 220A of the stator core 220. The lower yoke part end surfaces (not shown) and the lower tooth part end surfaces (not shown) of the core members 225 form the lower stator core end surface (not shown) of the stator core 220. The yoke parts 221 of the core members 225 form a yoke of the stator core 220. The tooth parts 222 of the core members 225 form teeth of the stator core 220.

In the stator core 220 of this embodiment, the tooth part 222 corresponds to a "tooth" of the present disclosure, and the upper tooth part end surface 222*a*, the lower tooth part end surface, the tooth part side surface 222*c* and the tooth part side surface 222*d* of the tooth 222 correspond to a "first outer wall surface", a "second outer wall surface", a "third outer wall surface" and a "fourth outer wall surface" of the present disclosure, respectively.

Figure 10:
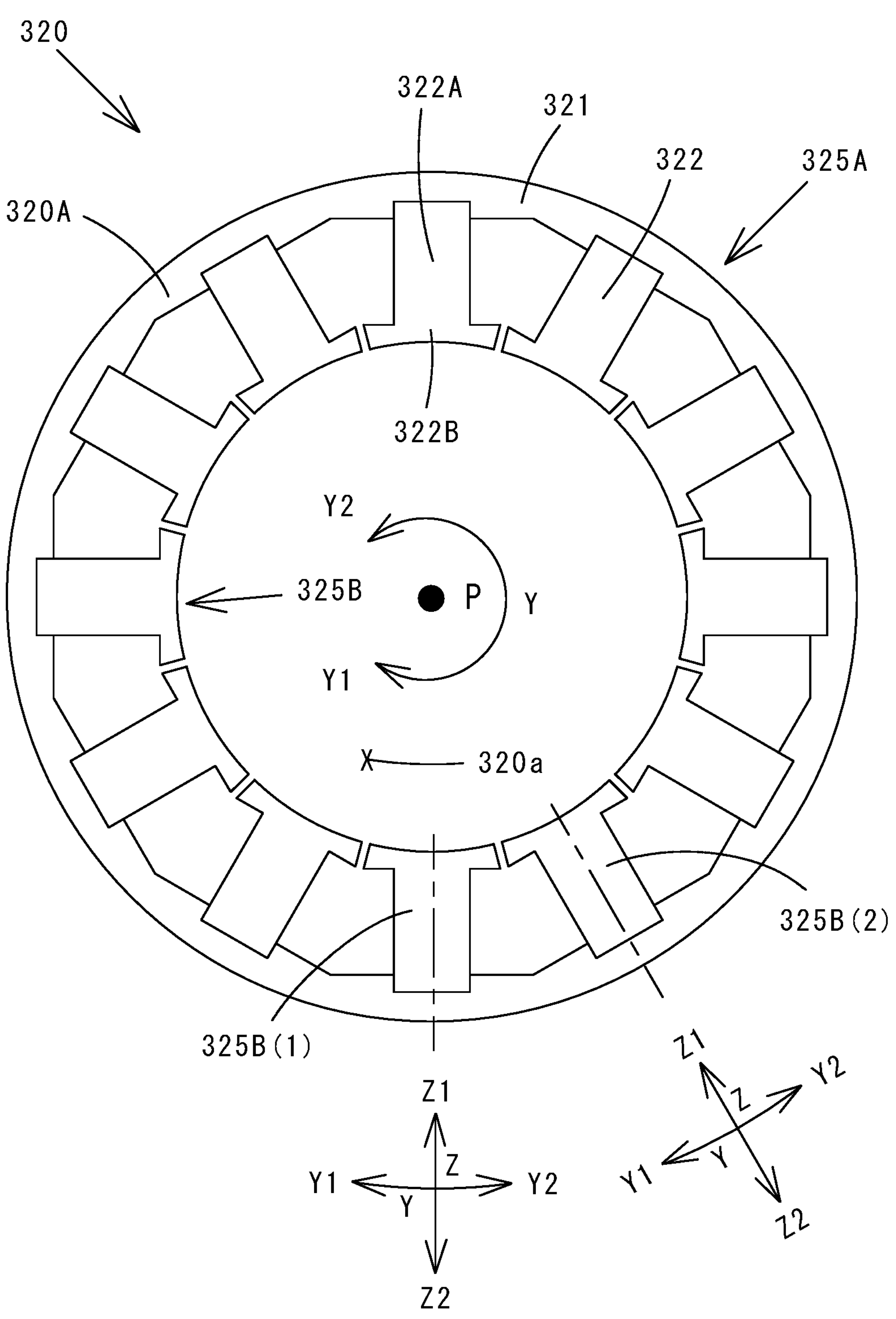
FIG. 10 is a top plan view of a third embodiment of a stator core that can be used to form a stator for use in the compressor of FIG. 1.

A stator 320 of a third embodiment will be described with reference to FIGS. 10 and 11.

The stator core 320 of this embodiment consists of a first core member 325A and second core members 325B. Each of the first core member 325A and the second core members 325B is formed (composed) of electromagnetic steel sheets laminated in the axial direction.

The first core member 325A has a yoke part 321 extending in the circumferential direction.

Figure 11:
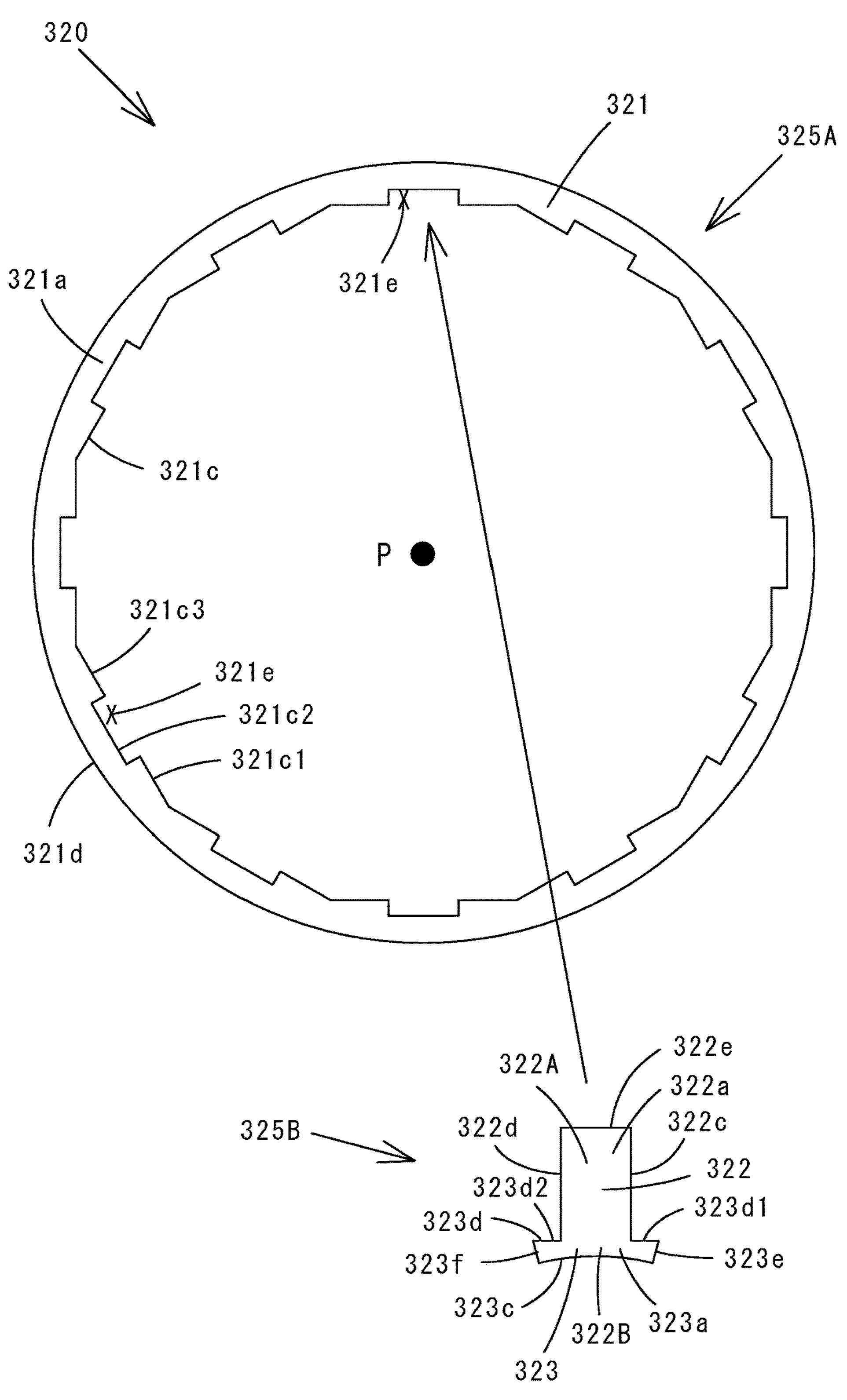
FIG. 11 schematically shows the assembly of a first core member and a second core member to form a third embodiment of a stator core usable in the stator of FIG. 2.

The yoke part 321 has upper and lower yoke part end surfaces (the upper yoke part end surface 321*a* is shown in FIG. 11; the lower yoke part end surface is on the opposite side of the yoke part 321 in the X direction), a yoke part inner peripheral surface 321*c* and a yoke part outer peripheral surface 321*d*. The yoke part inner peripheral surface 321*c* includes yoke part inner peripheral surface portions 321*c*1, 321*c*3, 321*c*3. The yoke part inner peripheral surface portions 321*cl* and 321*c*3 extend along sides of a regular polygon, the number of sides of which corresponds to the number of the teeth. The yoke part inner peripheral surface portion 321*c*2 defines a recess 321*e* that is recessed outward in the radial direction from the yoke part inner peripheral surface 321*c* (the yoke inner peripheral surface portions 321*c*1, 321*c*3).

Each second core member 325B has a base part 322 extending in the radial direction and a tip part 323 formed on the inner side of the base part 322 in the radial direction and extending in the circumferential direction.

The base part 322 has upper and lower base part end surfaces (the upper base part end surface 322*a* is shown in FIG. 11; the lower base part end surface is on the opposite side of the base part 322 in the X direction), base part side surfaces 322*c* and 322*d*, and a base part outer peripheral surface 322*e*.

The tip part 323 has an upper tip part end surface 323*a*, a lower tip part end surface that is on the opposite side of the tip part 323 in the X direction, a tip part inner peripheral surface 323*c*, a tip part outer peripheral surface 323*d*, and tip part side surfaces 232*e* and 323*f*. The tip part outer peripheral surface 323*d* includes a tip part outer peripheral surface portion 323*d*1 formed on the first side in the circumferential direction and a tip part outer peripheral surface portion 323*d*2 formed on the second side in the circumferential direction. The tip part side surface 323*e* is formed on the first side in the circumferential direction and a tip part side surface 323*f* is formed on the second side in the circumferential direction.

The stator core 320 is formed by inserting (for example, press-fitting) the base outer peripheral surfaces 322*e* of the bases 322 of the second core members 325B into the respective recesses 321*e* of the first core member 325A.

The tip part inner peripheral surface 323*c* of the second core member 325B extends along an arc centered on the stator core center line P. A stator core interior space 320*a* is defined by the tip part inner peripheral surface 323*c* of the second core member 325B.

The upper yoke part end surface 321*a* of the first core member 325A, and the upper base end surfaces 322*a* and the upper tip part end surfaces 323*a* of the second core members 325B form the upper stator core end surface 320A of the stator core 320. The lower yoke part end surface (not shown) of the first core member 325A, and the lower base end surfaces (not shown) and the lower tip part end surfaces (not shown) of the second core members 325B form the lower stator core end surface (not shown) of the stator core 320.

The yoke part 321 of the first core member 325A constitutes a yoke of the stator core 320. The base parts 322 and the tip parts 323 of the second core members 325B constitute the teeth of the stator core 320.

In this embodiment, each tooth includes a tooth base part 322A extending in the radial direction and a tooth tip part 322B formed on the inner side of the tooth base part 322A in the radial direction and extending in the circumferential direction. The tooth base part 322A is defined by the base end surfaces 322*a*, 322*b* and the base side surfaces 322*c*, 322*d* of the second core member 325B. The tooth tip part 322B is defined by the upper and lower tip part end surfaces 323*a*, the tip part inner peripheral surface 323*c* and the tip part outer peripheral surface 323*d* (the tip part outer peripheral surface portions 323*d*1, 323*d*2) of the second core member 325B.

In the stator core 320 of this embodiment, the base part 322 (the tooth base part 322A) corresponds to a "tooth inserted into a tooth insertion hole" of the present disclosure.

Furthermore, the base part end surface 322*a*, the base end surface 322*b*, the base part side surface 322*c* and the base part side surface 322*d* correspond to the "first outer wall surface", the "second outer wall surface", the "third outer wall surface" and the "fourth outer wall surface" of the present disclosure, respectively.

Additional embodiments of electrical insulators according to the present disclosure will be described in the following.

The electrical insulators of the additional embodiments described below differ only in the number, the arrangement positions and the extending directions of the projections; the other structures (the first and second flange parts, the body part, the through hole and the inner wall surface) are the same as those of the electrical insulator 130 of the first embodiment. Therefore, only the projections are described below.

In FIGS. 12 to 22, parts equivalent to the first and second flange parts, the body part, the through hole and the inner wall surface of the electrical insulator 130 of the first embodiment are given the same numerals except for the numeral of the hundreds place digit.

Figure 12:
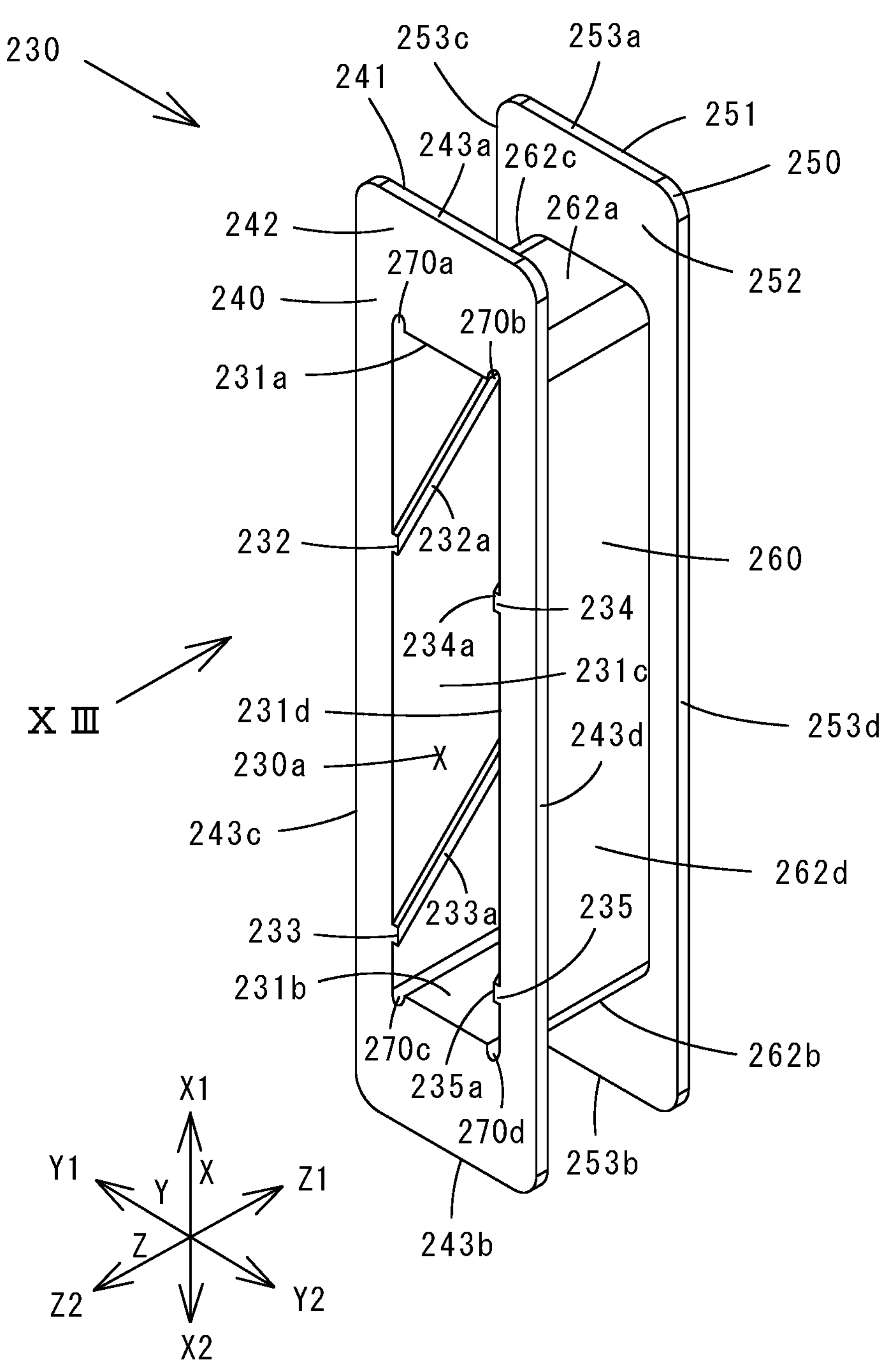
FIG. 12 is a perspective view of a second embodiment of an electrical insulator according to the present disclosure.
Figure 13:
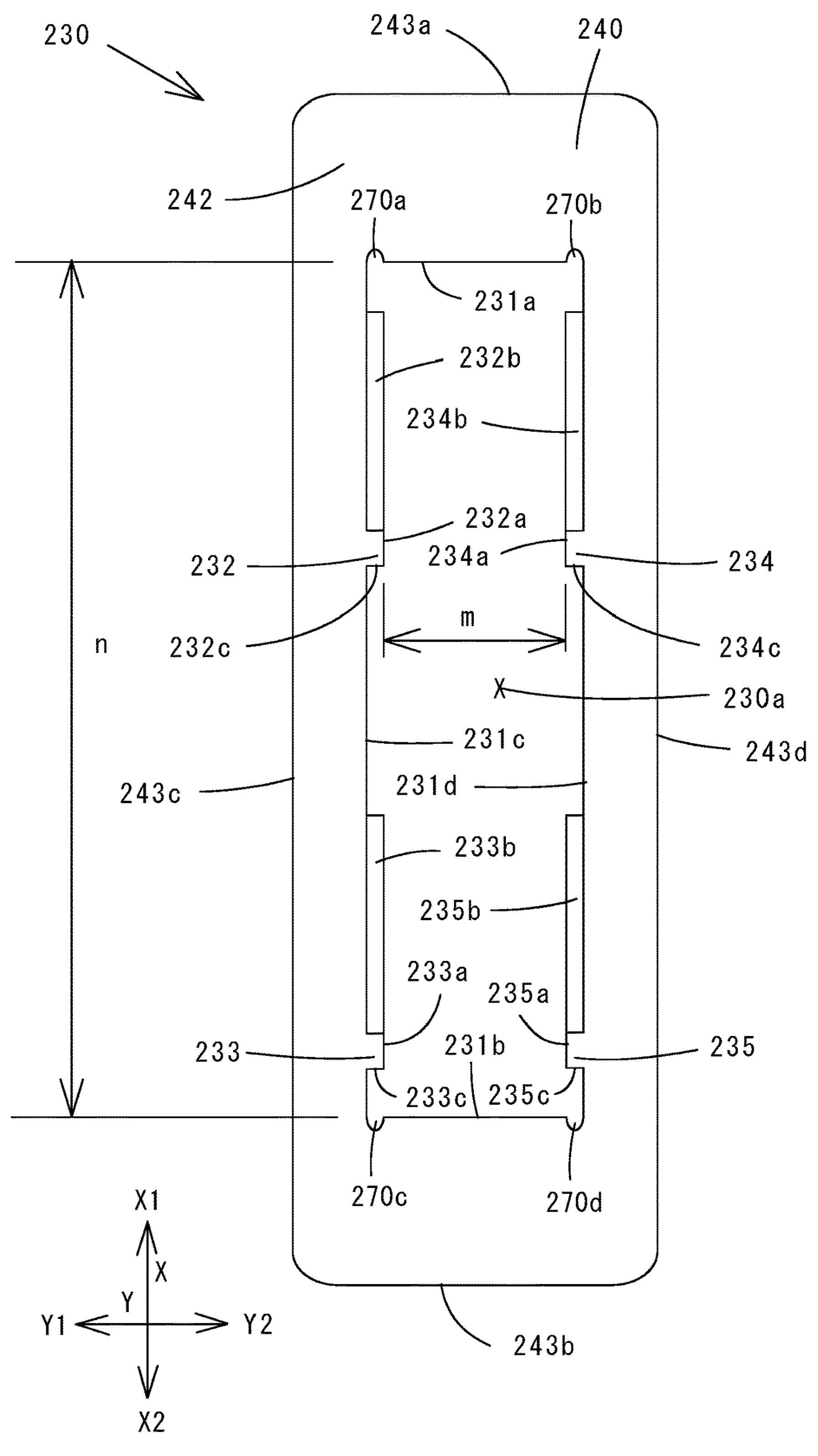
FIG. 13 is a view of the electrical insulator of FIG. 12 in the direction of arrow XIII in FIG. 12.

An electrical insulator 230 of a second embodiment will be described with reference to FIGS. 12 and 13.

In this embodiment, two projections 232, 233 are formed on an inner wall surface 231*c* (third inner wall surface), and two projections 234, 235 are formed on an inner wall surface 231*d* (fourth inner wall surface).

The projections 232 to 235 extend in a direction oblique to the radial direction. Each of the projections 232 to 235 is formed by a single continuous protruding part (rib, ridge).

In this embodiment, the projections 232 to 235 are inclined such that the distance from an inner wall surface 231*a* gradually decreases (the distance from an inner wall surface 231*b* gradually increases) toward the inner side (Z1 side) from the outer side (Z2 side) in the radial direction. The projections 232 to 235 may also be inclined such that the distance from the inner wall surface 231*a* gradually increases toward the inner side (Z1 side) from the outer side (Z2 side) in the radial direction. The inclination angle can be appropriately set.

In this embodiment, the electrical insulator 230 has a second set of projections including the projections 232, 233 and the projections 234, 235.

The electrical insulator 230 of this embodiment has the same effect as the electrical insulator 130 of the first embodiment. In this embodiment, the contact area between the outer wall surface of the tooth and the projections is larger than that in the first embodiment, so that movement of the electrical insulator 230 relative to the tooth is more restrained (prevented, blocked, restricted). The contact area between the outer wall surface of the tooth and the projections is set such that the tooth can be easily inserted into a through hole 230*a*.

Figure 14:
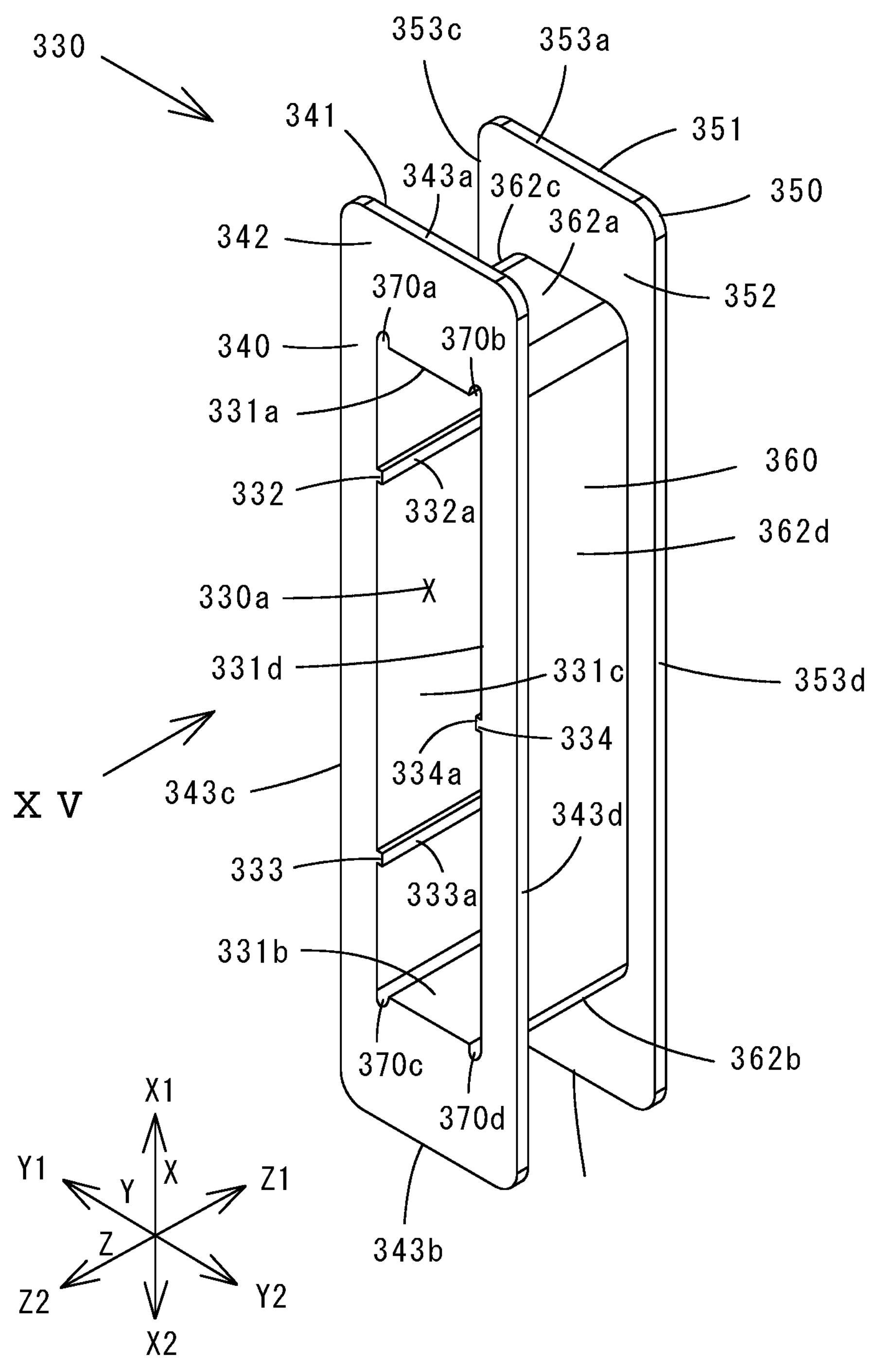
FIG. 14 is a perspective view of a third embodiment of an electrical insulator according to the present disclosure.
Figure 15:
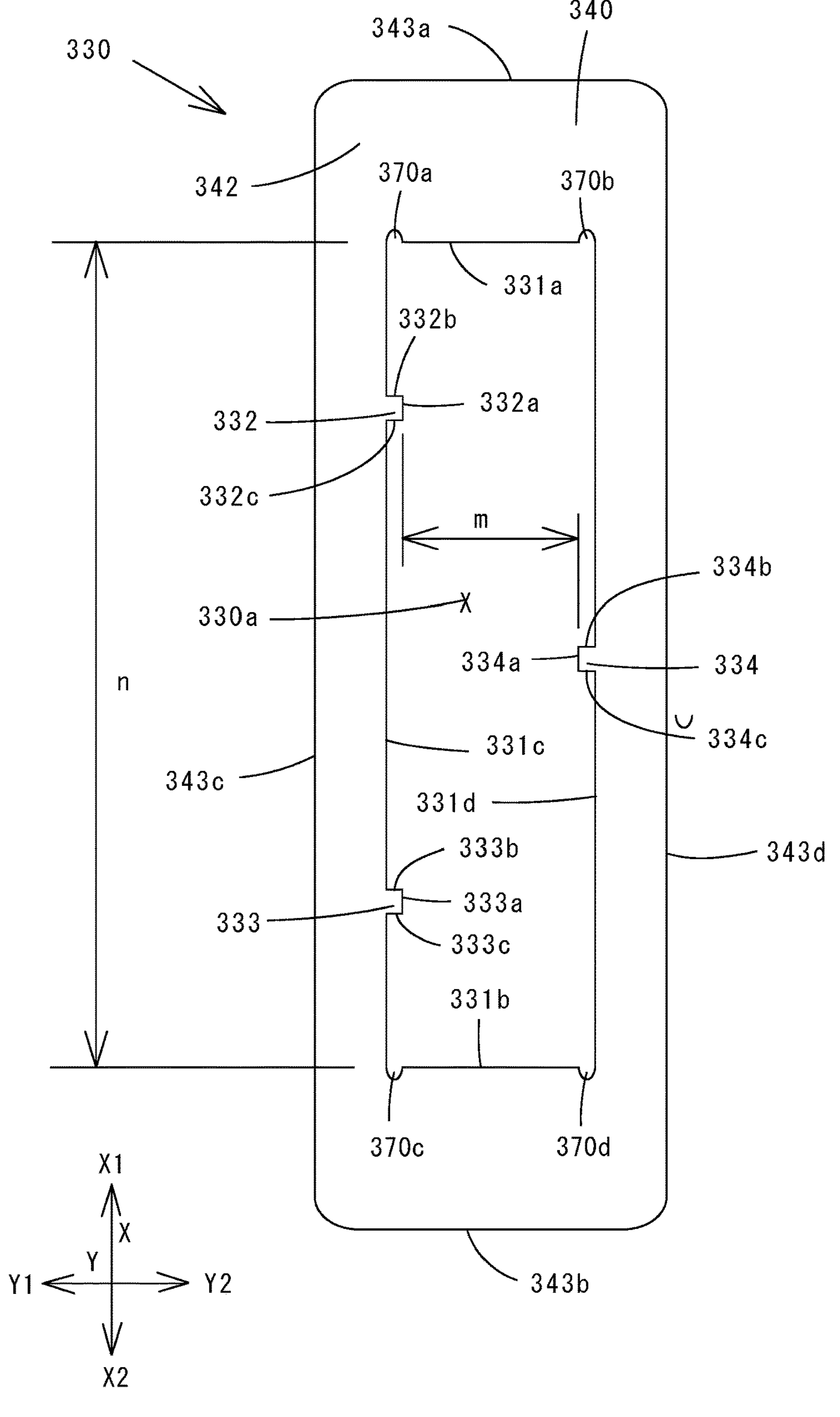
FIG. 15 is a view of the electrical insulator of FIG. 14 in the direction of arrow XV in FIG. 14.

An electrical insulator 330 of a third embodiment will be described with reference to FIGS. 14 and 15.

In this embodiment, two projections 332, 333 are formed on an inner wall surface 331*c* (third inner wall surface), and one projection 334 is formed on an inner wall surface 331*d* (fourth inner wall surface). The projections 332 to 334 extend parallel (or substantially parallel) to the radial direction. Each of the projections 332 to 334 is formed by a single continuous protruding part (rib, ridge).

The projection 334 is formed in the center of the inner wall surface 331*d* in the axial direction. The projections 332, 333 are formed at an equal distance from the projection 334 in the axial direction.

In this embodiment, the electrical insulator 330 has a second set of projections including the projections 332, 333 and the projection 334.

The electrical insulator 330 of this embodiment has the same effect as the electrical insulator 130 of the first embodiment, even with a smaller number of projections.

The arrangement positions and the extending directions of the projections 332 to 334 may be appropriately changed.

For example, one projection may be formed on the inner wall surface 331*c* (third inner wall surface), and two projections may be formed on the inner wall surface 331*d* (fourth inner wall surface).

Figure 16:
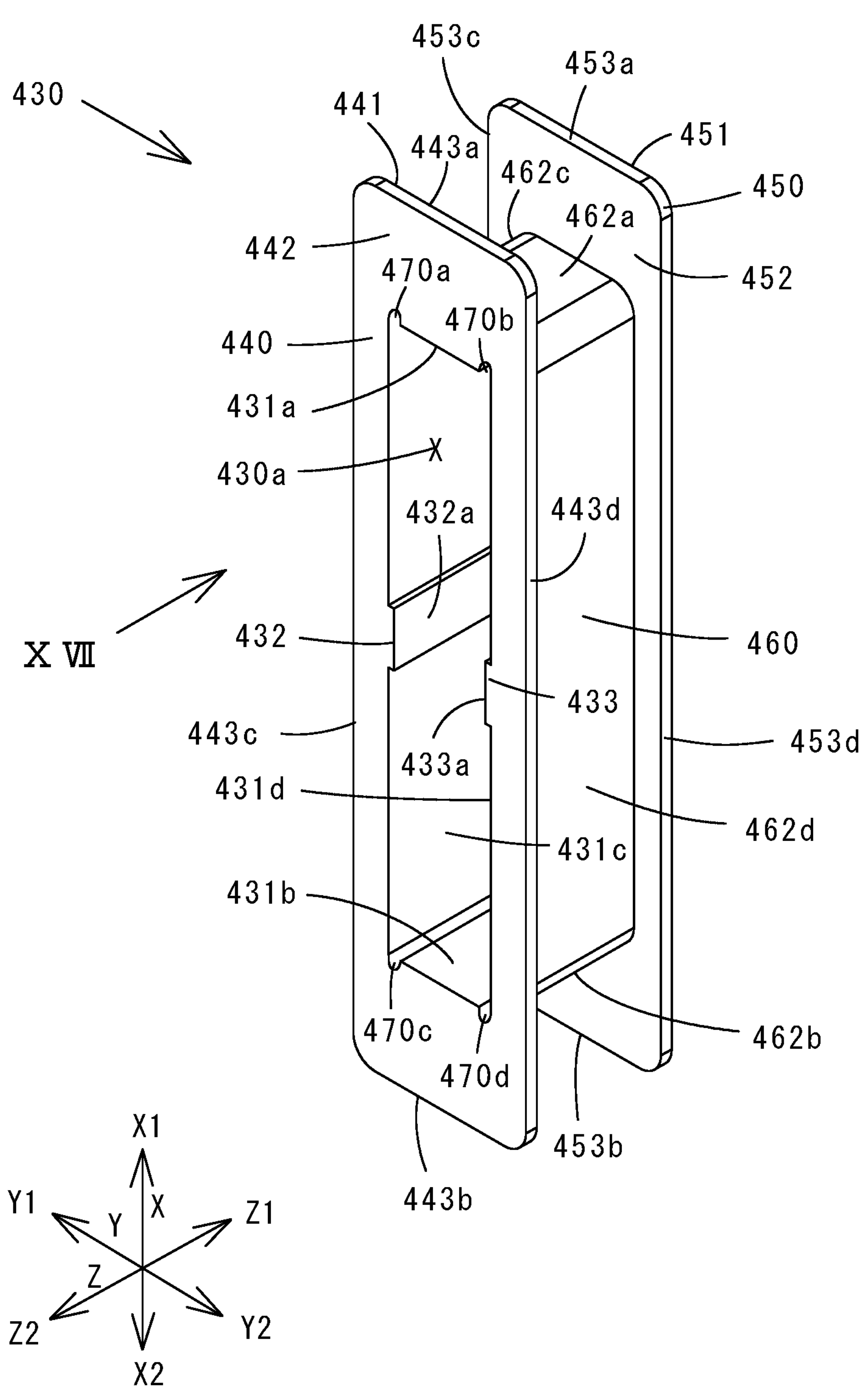
FIG. 16 is a perspective view of a fourth embodiment of an electrical insulator according to the present disclosure.
Figure 17:
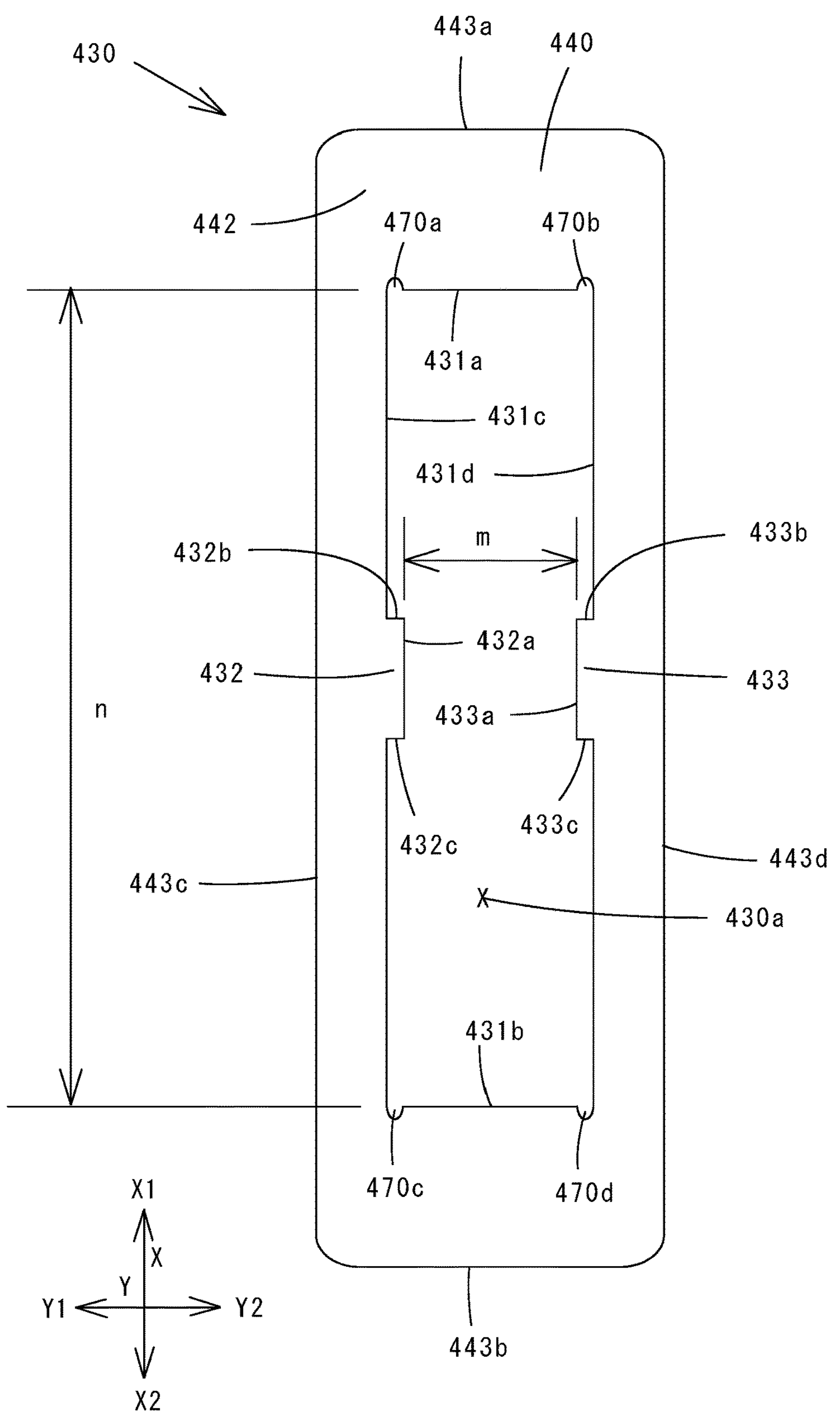
FIG. 17 is a view of the electrical insulator of FIG. 16 in the direction of arrow XVII in FIG. 16.

An electrical insulator 430 of a fourth embodiment will be described with reference to FIGS. 16 and 17.

In this embodiment, one projection 432 is formed on an inner wall surface 431*c* (third inner wall surface), and one projection 433 is formed on an inner wall surface 431*d* (fourth inner wall surface). The projections 432, 433 extend parallel (or substantially parallel) to the radial direction. Each of the projections 432, 433 is formed by a single continuous protruding part (rib, ridge0.

In this embodiment, the projections 432, 433 are formed to have a wider width in the axial direction such that the electrical insulator 430 is stably held on the tooth. The projections 432, 433 are respectively formed in the centers of the inner wall surfaces 431*c*, 431*d* in the axial direction. The width of the projections 432, 433 may be appropriately set.

In this embodiment, the electrical insulator 430 has a second set of projections including the projections 432, 433.

The electrical insulator 430 of this embodiment has the same effect as the electrical insulator 130 of the first embodiment, even with a smaller number of projections.

The arrangement positions and the extending directions of the projections 432, 433 may be appropriately changed.

Figure 18:
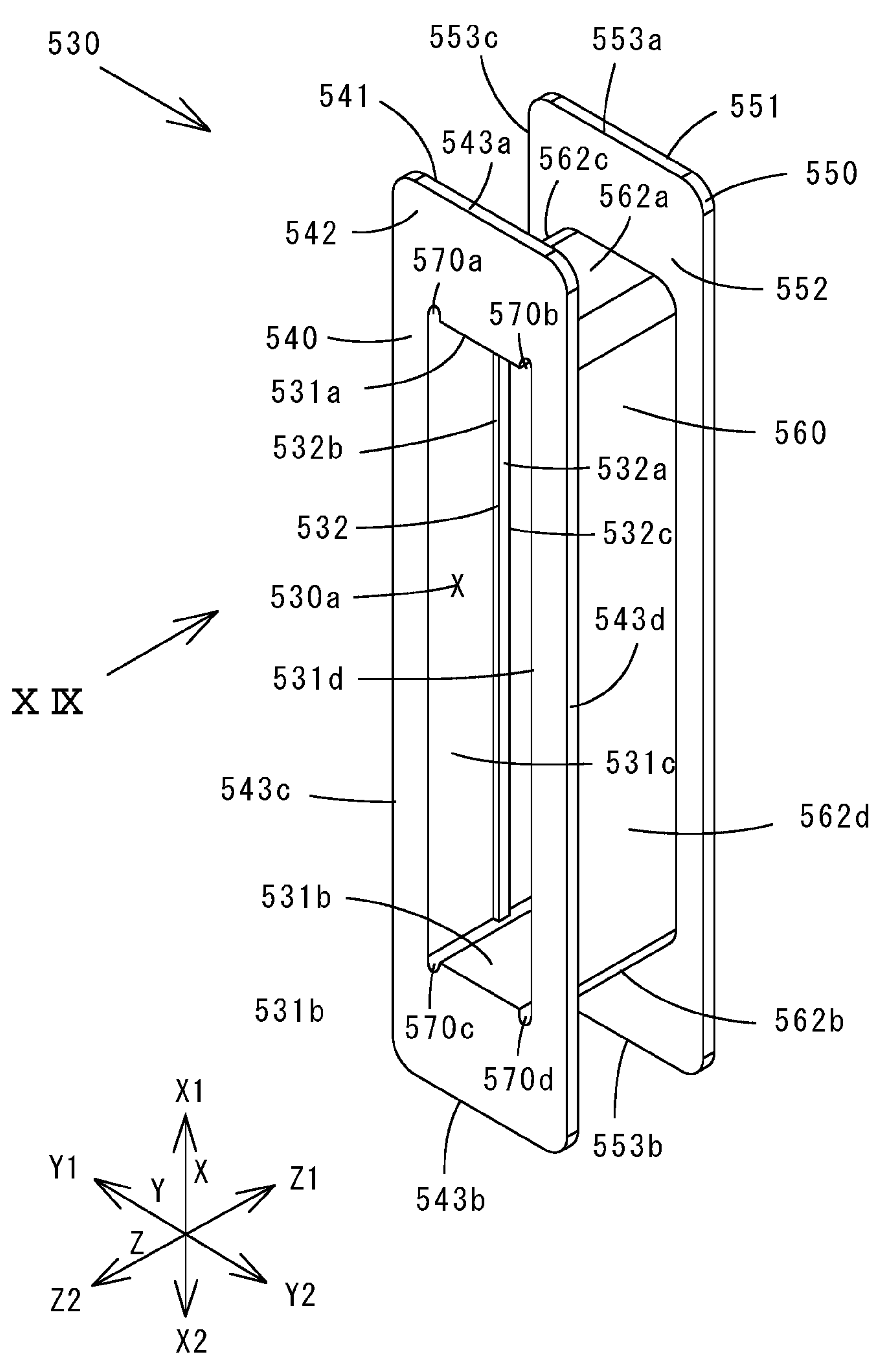
FIG. 18 is a perspective view of a fifth embodiment of an electrical insulator according to the present disclosure.
Figure 19:
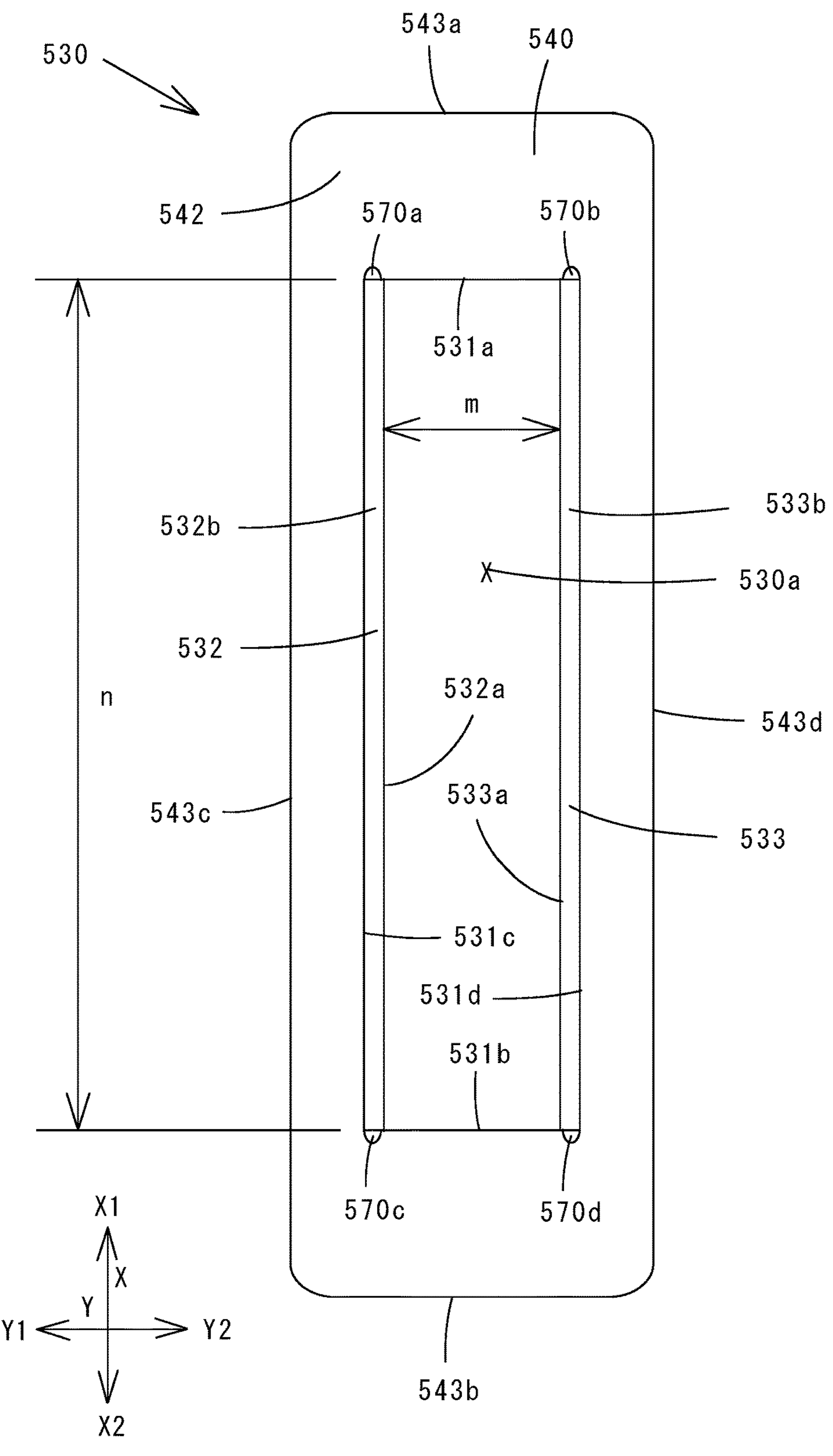
FIG. 19 is a view of the electrical insulator of FIG. 18 in the direction of arrow XIX in FIG. 18.

An electrical insulator 530 of a fifth embodiment will be described with reference to FIGS. 18 and 19.

In this embodiment, one projection 532 is formed on an inner wall surface 531*c* (third inner wall surface) and one projection 533 is formed on an inner wall surface 531*d* (fourth inner wall surface). The projections 532, 533 extend parallel (or substantially parallel) to the axial direction. The projections 532, 533 are respectively formed in the centers of the inner wall surfaces 531*c*, 531*d* in the radial direction. Each of the projections 532, 533 is formed by a single continuous protruding part.

The width of an outer wall surface 532*a* formed on the second side of the projection 532 in the circumferential direction and the width of an outer wall surface 533*a* formed on the first side of the projection 533 in the circumferential direction may be appropriately set.

In this embodiment, the electrical insulator 530 has a second set of projections including the projections 532, 533.

The electrical insulator 530 of this embodiment has the same effect as the electrical insulator 130 of the first embodiment, even with a smaller number of projections.

The arrangement positions and the extending directions of the projections 532, 533 may be appropriately changed.

Figure 20:
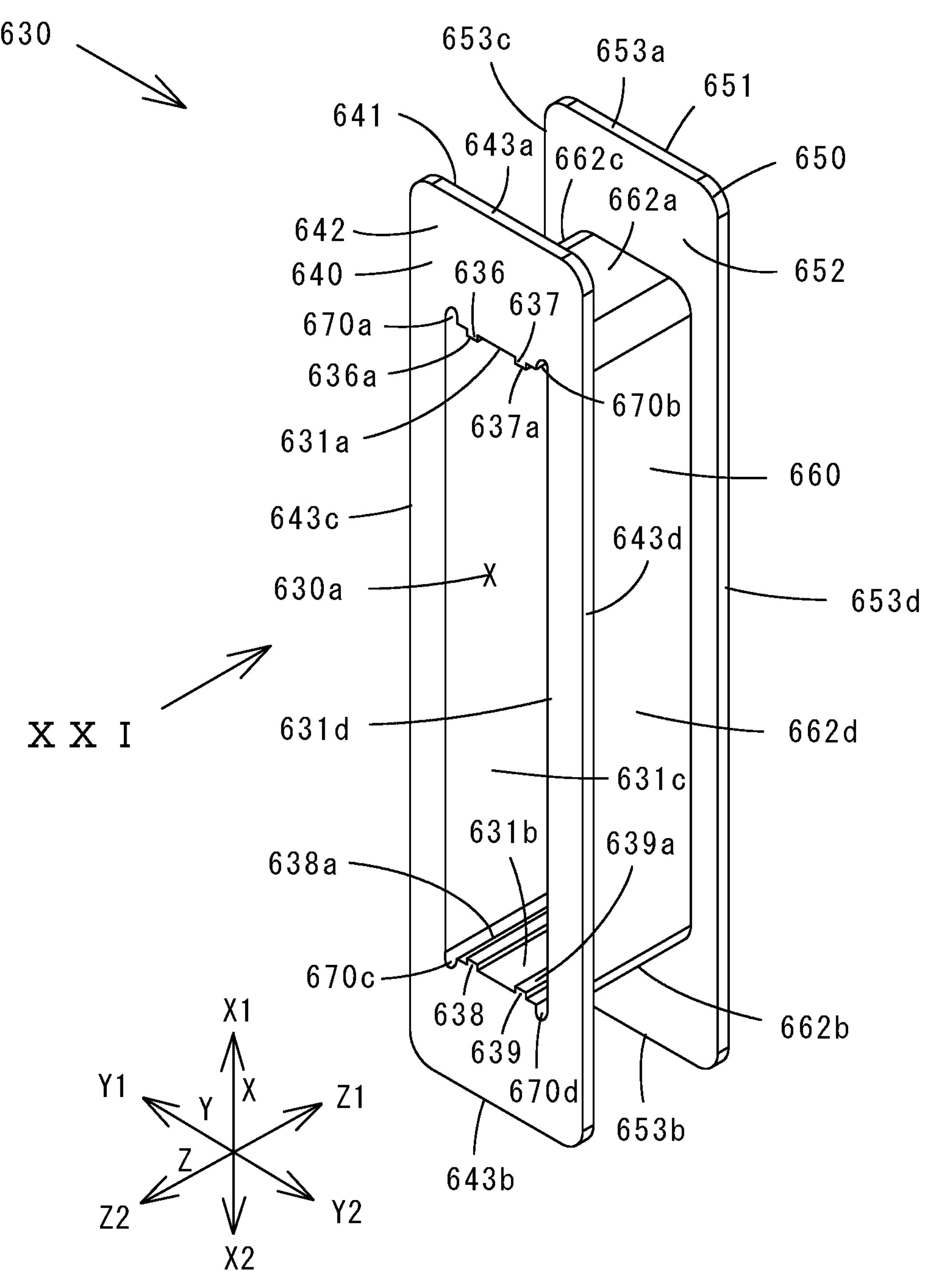
FIG. 20 is a perspective view of a sixth embodiment of an electrical insulator according to the present disclosure.
Figure 21:
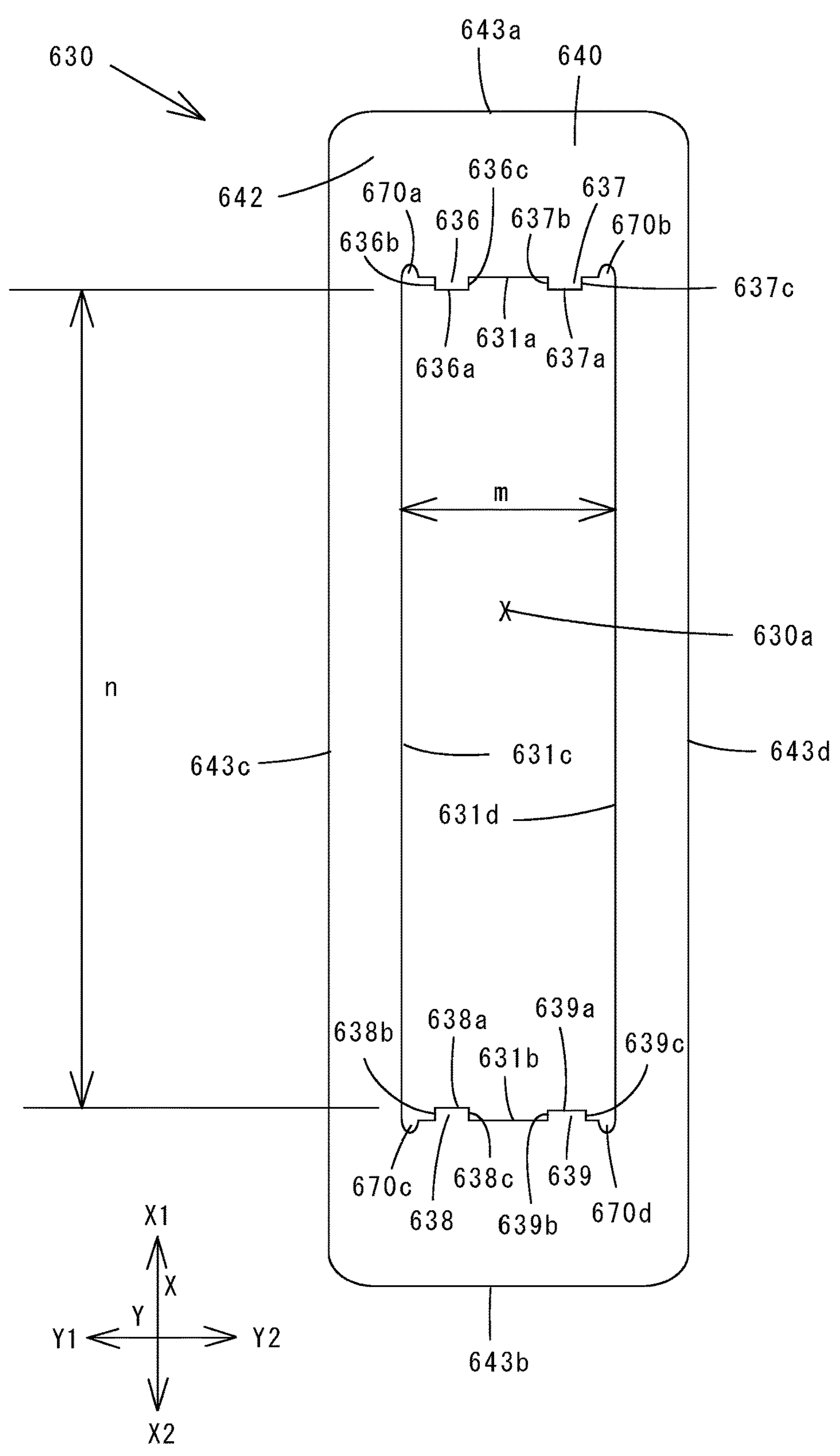
FIG. 21 is a view of the electrical insulator of FIG. 20 in the direction of arrow XXI in FIG. 20.

An electrical insulator 630 of a sixth embodiment will be described with reference to FIGS. 20 and 21.

In this embodiment, two projections 636, 637 are formed on an inner wall surface 631*a* (first inner wall surface), and two projections 638, 639 are formed on an inner wall surface 631*b* (second inner wall surface). The projections 636 to 639 extend parallel (or substantially parallel) to the radial direction. Each of the projections 636 to 639 is formed by a single continuous protruding part (rib, ridge).

The projections 636, 637 and the projections 638, 639 are formed at positions facing each other in the axial direction. The projections 636, 637 are formed at an equal distance from a center of the inner wall surface 631*a* in the circumferential direction, and the projections 638, 639 are formed at an equal distance from a center of the inner wall surface 631*b* in the circumferential direction.

In this embodiment, the electrical insulator 630 has a first set of projections. The first set of projections includes projections each protruding from the inner surface wall into the through hole in the axial direction. In this embodiment, the first set of projections includes the projections 636, 637 formed on the first inner wall surface 631*a* and the projections 638, 639 formed on the second inner wall surface 631*b*.

The electrical insulator 630 of this embodiment is fitted onto the tooth while being restrained (prevented, blocked, restricted) from moving relative to the tooth by abutment of the tooth side surface formed on the first side in the axial direction on the projections 636, 637 and abutment of the tooth side surface formed on the second side in the axial direction on the projections 638, 639.

Thus, length n (see FIG. 21) between the projections 636 and 638 (637 and 639) in the axial direction is set slightly shorter than the length N (see FIG. 8) of the tooth in the axial direction. The length n is set such that it is possible to insert the tooth into the through hole 630*a* while achieving the effect of restraining movement of the electrical insulator 630 relative to the tooth.

In this embodiment, the electrical insulator 630 is restricted (prevented, blocked, restrained) from moving in the axial direction relative to the tooth by abutment between the tooth end surfaces formed on the both sides in the axial direction and the projections 636 to 639 and is restrained from moving in the circumferential direction and the radial direction relative to the tooth.

In the electrical insulator 630 of this embodiment, when the tooth is inserted into the through hole 630*a*, a load is applied in the radial direction to the tooth end surfaces on the first and second sides in the axial direction. Thus, a load is applied in the extending direction of the electromagnetic steel sheets to the electromagnetic steel sheets arranged on the first and second sides of the tooth in the axial direction.

However, in this embodiment, the contact area between the tooth end surfaces on the first and second sides in the axial direction and the projections 636 to 639 is small compared with the contact area between the tooth end surfaces on the first and second sides in the axial direction and the inner wall surfaces on the first and second sides in the axial direction in the prior art. Therefore, the insertion resistance in inserting the tooth into the through hole 630*a* is small.

The force of holding the electrical insulator 630 on the tooth by abutment between the tooth end surfaces and the projections 636 to 639 can be increased by adjusting the height (the protruding length from the inner wall surfaces 631*a*, 631*b*) of the projections 636 to 639, without causing difficulty when inserting the tooth into the through hole 630*a*.

The number and the arrangement positions of the projections formed on the inner wall surfaces 631*a*, 631*b* may be appropriately changed, for example, like in the second to fifth embodiments.

Figure 22:
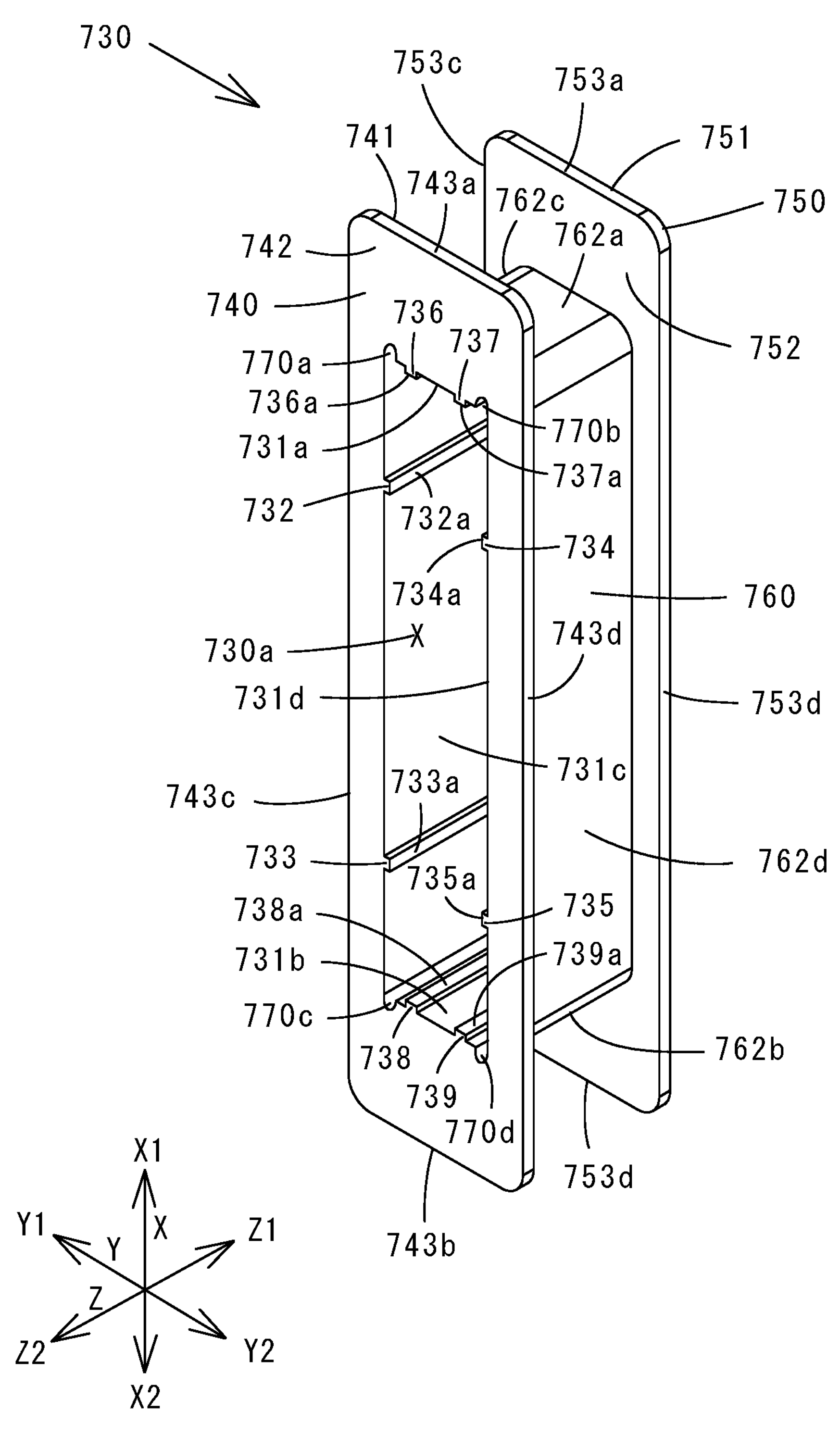
FIG. 22 is a perspective view of a seventh embodiment of an electrical insulator according to the present disclosure.
Figure 23:
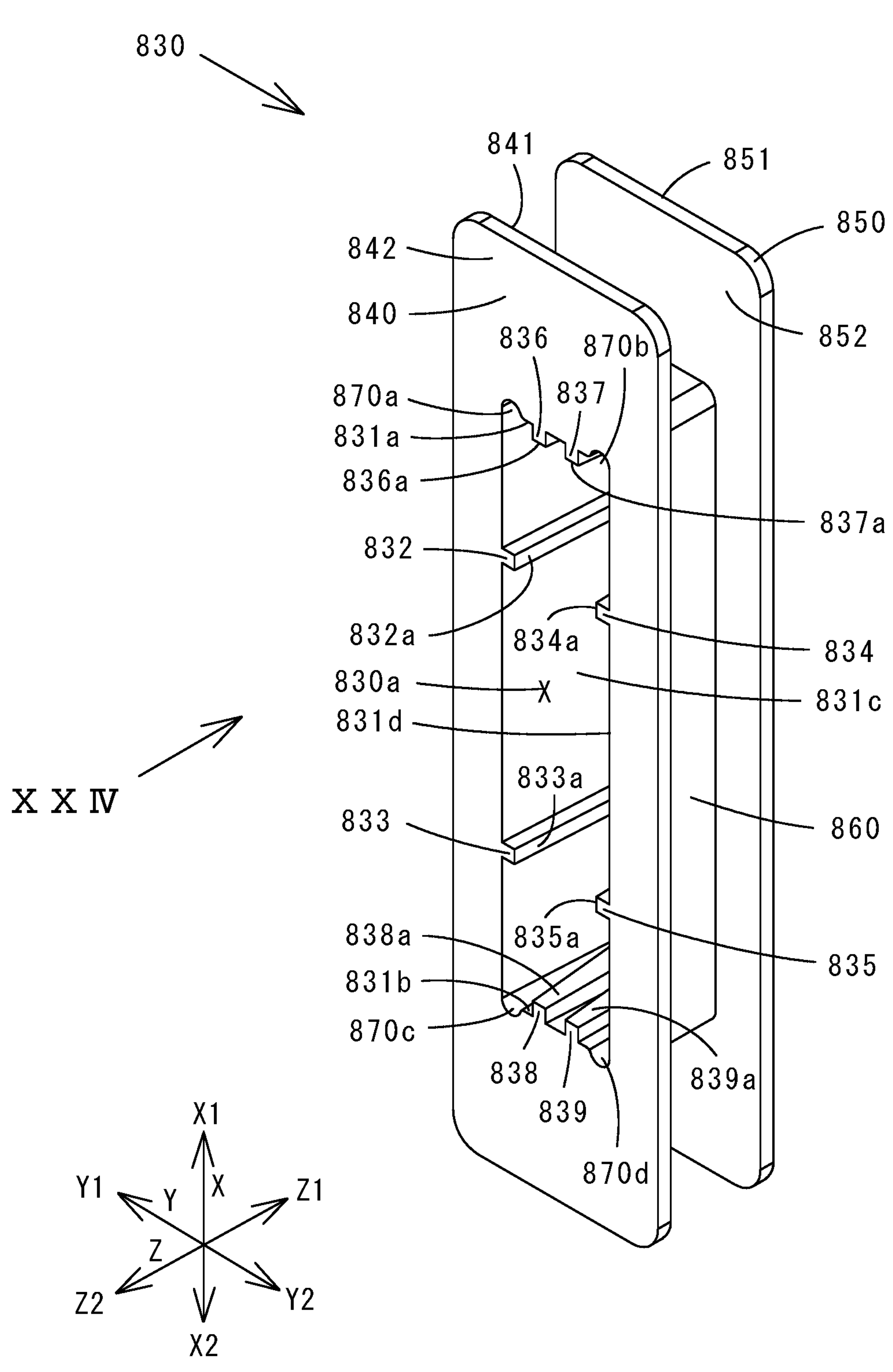
FIG. 23 is a perspective view of an eighth embodiment of an electrical insulator according to the present disclosure.
Figure 24:
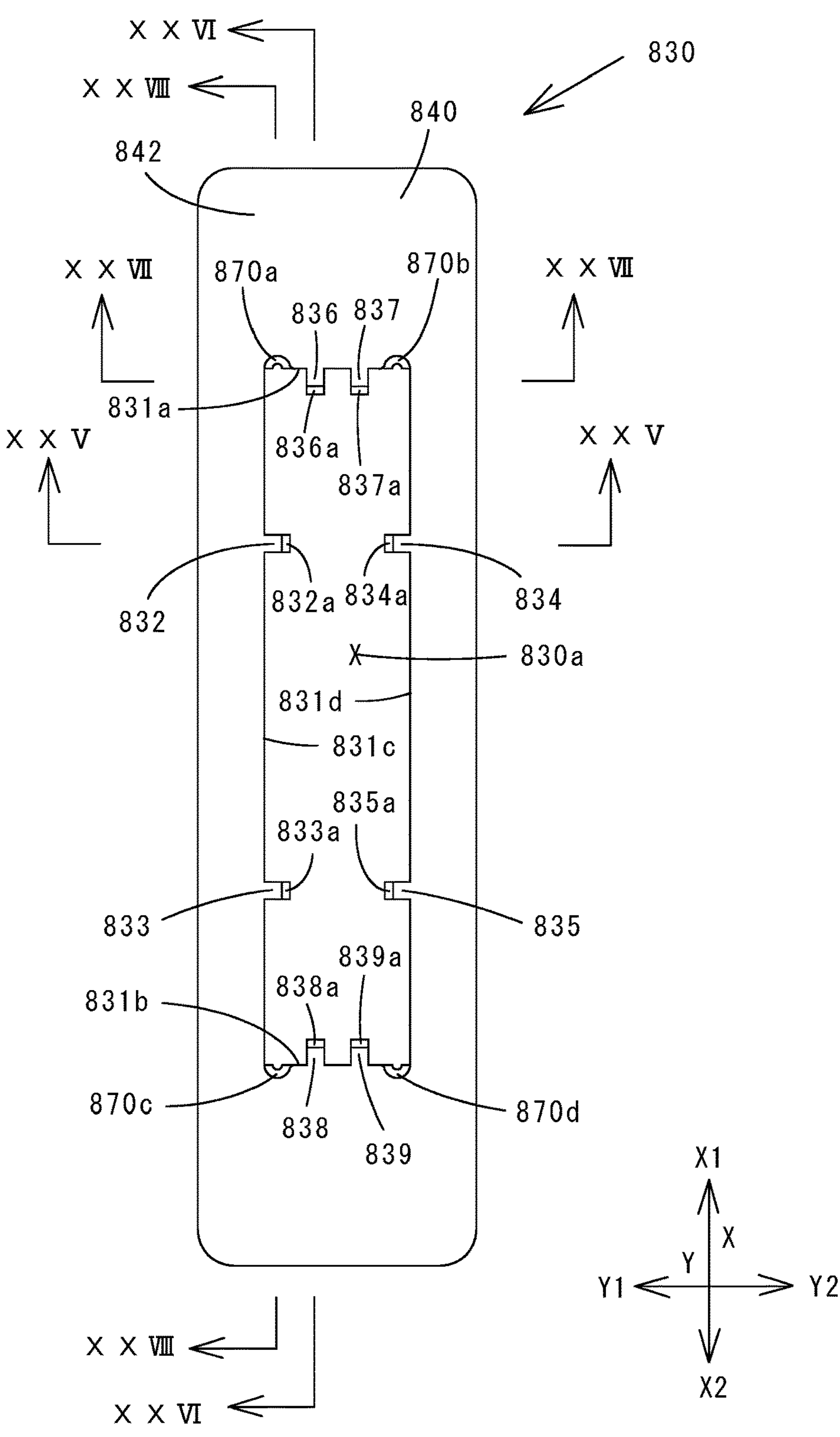
FIG. 24 is a view of the electrical insulator of FIG. 23 in the direction of arrow XXIV in FIG. 23.

An electrical insulator 730 of a seventh embodiment will be described with reference to FIG. 22.

In this embodiment, like the electrical insulator 130 of the first embodiment, two projections 732, 733 are formed on an inner wall surface 731*c* (third inner wall surface), and two projections 734, 735 are formed on an inner wall surface 731*d* (fourth inner wall surface). Furthermore, like the electrical insulator 630 of the sixth embodiment, two projections 736, 737 are formed on an inner wall surface 731*a* (first inner wall surface), and two projections 738, 739 are formed on an inner wall surface 731*b* (second inner wall surface).

In this embodiment, the electrical insulator 730 has a first set of projections including the projections 736, 737, 738, 739, and a second set of projections including the projections 732, 733, 734, 735.

The electrical insulator 730 of this embodiment is restrained from moving relative to the tooth by abutment between the outer wall surface formed on the first side of the tooth in the circumferential direction and the projections 732, 733, abutment between the outer wall surface formed on the second side of the tooth in the circumferential direction and the projections 734, 735, abutment between the outer wall surface formed on the first side of the tooth in the axial direction and the projections 736, 737, and abutment between the outer wall surface formed on the second side of the tooth in the axial direction and the projections 738, 739.

The electrical insulator 730 of the seventh embodiment may be changed or modified similarly to the electrical insulators of the second to sixth embodiments.

In embodiments in which the electric insulator is integrally molded from a polymer (preferably, an electrically insulating polymer), at least portions of the inner wall of the electrical insulator may be inclined along the radial direction Z to make the electrical insulator easier to remove from a mold.

Figure 25:
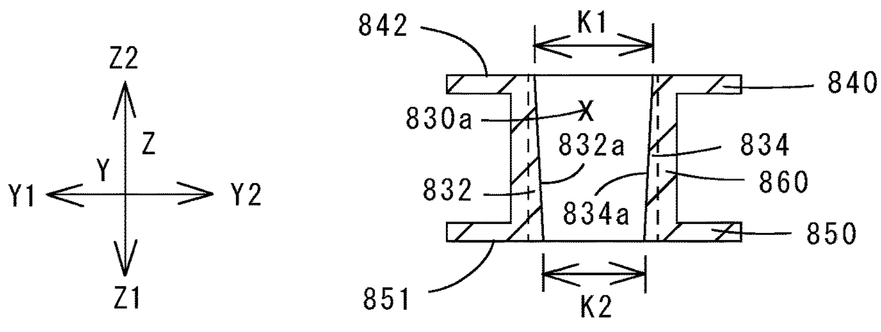
FIG. 25 is a sectional view taken in the direction of line XXV-XXV in FIG. 24.

As shown in FIG. 25, a distance along the circumferential direction Y between projections 832 (833) formed (defined, provided) on the third inner wall surface 831*c* and the projections 834 (835) formed (defined, provided) on the fourth inner wall surface 831*d* decreases in a radial direction from an insertion side Z2, where the projections are spaced by a first distance K1, to a back side Z1, where the projections are spaced by a second distance K2 (K1>K2). In other words, the height of the projections 832, 833, 834, 835 in the circumferential direction Y increases from the insertion side Z2 to the back side Z1.

Figure 26:
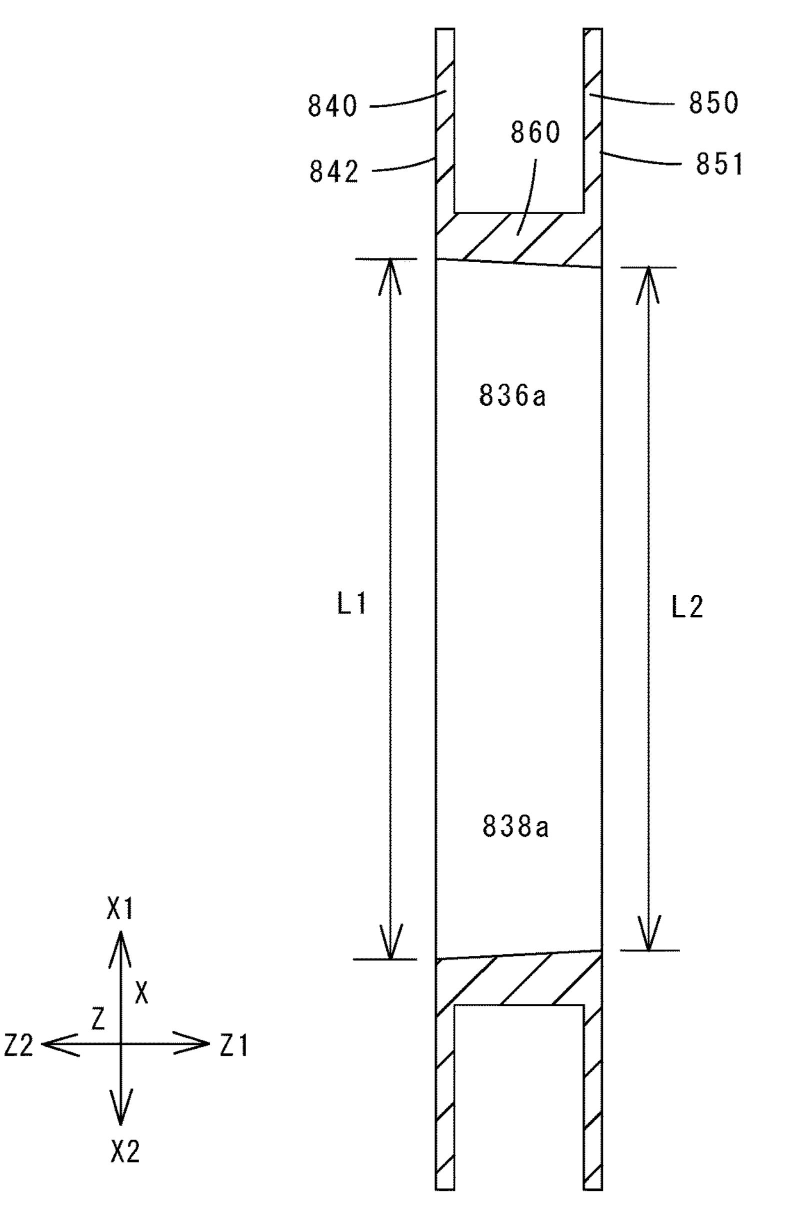
FIG. 26 is a sectional view taken in the direction of line XXVI-XXVI in FIG. 24.

Furthermore, as shown in FIG. 26, a distance along the axial direction X between projections 836 (837) formed (defined, provided) on the first inner wall surface 831*a* and the projections 838 (839) formed (defined, provided) on the second inner wall surface 831*b* decreases in a direction from the insertion side (Z2 where the projections are spaced by a first distance L1, to the back side Z1, where the projection are spaced by a distance L2 along the radial direction Z (L1>L2). That is, the height of the projections 836, 837, 838, 839 increases in the axial direction X from the insertion side Z2 to the back side Z1.

The structures of the projections 832, 833, 834, 835 and/or the projections 836, 837, 838, 839 discussed above facilitate the removal of the electrical insulators from a mold as well as the insertion of a tooth into the tooth insertion hole of the electrical insulator while at the same time preventing (restricting, restraining, blocking) the electrical insulator from moving relative to the tooth after the tooth has been inserted into the tooth insertion hole.

Figure 27:
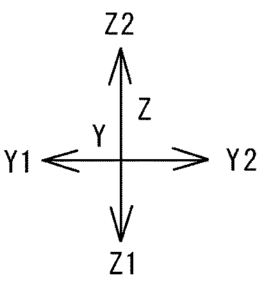
FIG. 27 is a sectional view taken in the direction of line XXVII-XXVII in FIG. 24.
Figure 27:
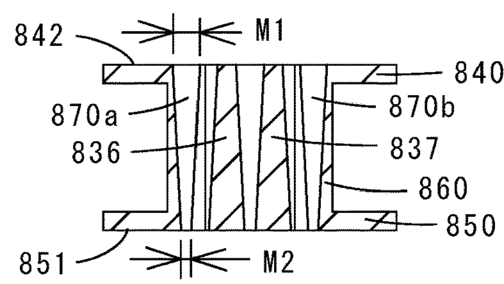
Figure 28:
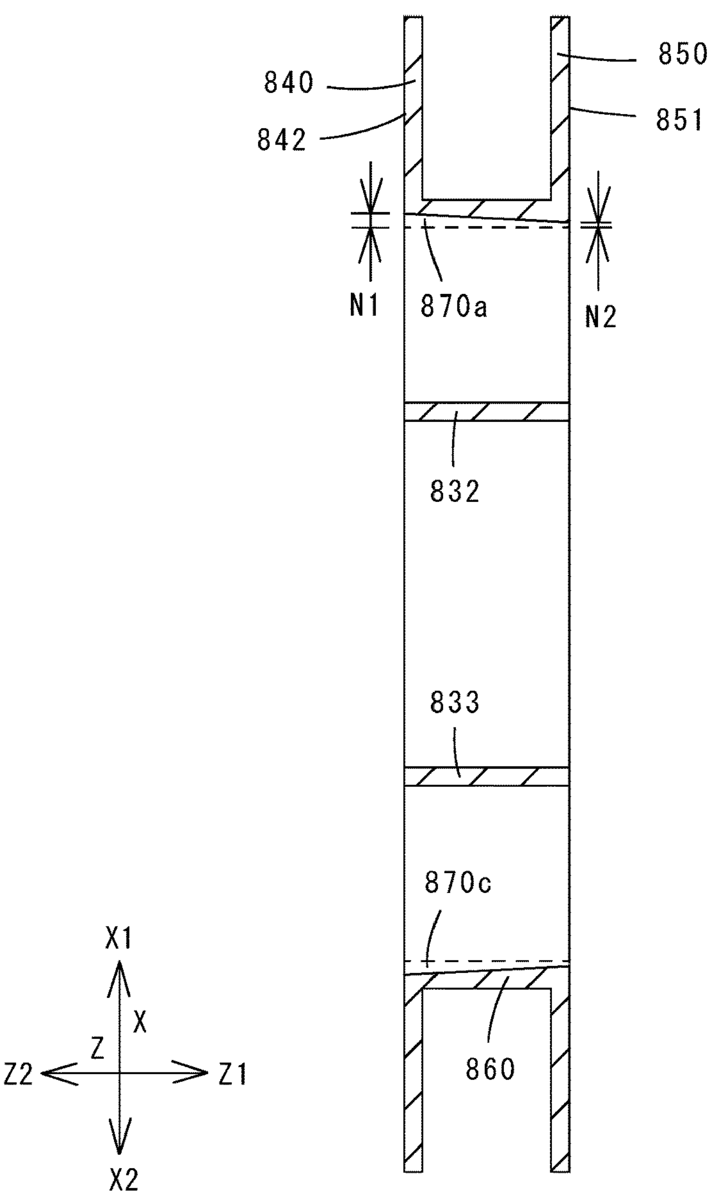
FIG. 28 is a sectional view taken in the direction of line XXVIII-XXVIII line in FIG. 24.

As shown in FIGS. 27 and 28, the width along the circumferential direction Y of each of the recesses 870*a*, 870*b*, 870*c*, 870*d* formed (defined, provided) at boundaries of the inner surfaces of the electrical insulator decreases in the direction from the insertion side Z2, where the width is M1, to the back side Z1, where the width is M2 (M1>M2). Furthermore, the height along the axial direction X of each of the recesses 870*a*, 870*b*, 870*c*, 870*d* decreases from the insertion side Z2, at which the height of the recesses is N1, to the back side Z1, where the height is N2 (N1>N2). The structures of the recesses 870*a*, 870*b*, 870*c*, 870*d* also facilitate the removal of the electrical insulator from a mold.

Thus it will be appreciated from the above descriptions that the insertion direction of the tooth into the tooth insertion hole is determined according to the structure of the stator core, in particular, the teeth of the stator core.

The present disclosure can be provided with the following features.

(Aspect 1) An electrical insulator fitted onto a tooth of a stator core, the tooth extending in a radial direction and having first, second, third and fourth outer wall surfaces respectively formed on first side and second side in an axial direction and third and fourth side in a circumferential direction, the electrical insulator having a tooth insertion hole into which the tooth is inserted, the electrical insulator being configured to be inserted into the tool hole while being restrained from moving relative to the tooth, wherein:

- the electrical insulator has an inner wall surface that defines the tooth insertion hole, and projections that protrude from the inner wall surface into the tooth insertion hole,
- the inner wall surface includes first to fourth inner wall surfaces that respectively face the first to fourth outer wall surfaces of the tooth when the tooth is inserted into the tooth insertion hole,
- the projections include at least one of a first set of projections and a second set of projections, the first set of projections including at least one first projection formed (defined) on the first inner wall surface and at least one second projection formed (defined) on the second inner wall surface, and the second set of projections including at least one third projection formed (defined) on the third inner wall surface and at least one fourth projection formed (defined) on the fourth inner wall surface, and the electrical insulator is configured to be restrained from moving relative to the tooth by abutment between the first to fourth outer wall surfaces of the tooth and the projections included in the at least one of the first and second sets of the projections.

(Aspect 2) The electrical insulator as defined in Aspect 1, wherein the at least one first projection and the at least one second projection extend in the radial direction or the axial direction, and the at least one third projection and the at least one fourth projection extend in the radial direction or the circumferential direction.

(Aspect 3) The electrical insulator as defined in Aspect 1 or 2, wherein the at least one first projection, the at least one second projection, the at least one third projection and the at least one fourth projection are each formed (defined) by one continuously extending protruding part (rib, ridge).

(Aspect 4) The electrical insulator as defined in Aspect 1 or 2, wherein the at least one first projection, the at least one second projection, the at least one third projection and the at least one fourth projection are each formed (defined) by a plurality of protruding parts (ribs, ridge) that are spaced apart from each other.

(Aspect 5) The electrical insulator as defined in any one of Aspects 1 to 4, wherein the projections include the second set of projections that includes at least one first third projection formed (defined) on the third fourth inner wall surface and at least one second projection formed on the fourth inner wall surface.

(Aspect 6) The electrical insulator as defined in any one of Aspects 1 to 5, wherein the second set of the projections includes at least two third projections formed (defined) spaced apart from each other in the axial direction on the third inner wall surface and at least one fourth projection formed (defined) on the fourth inner wall surface, or the second set of the projections includes at least one third projection formed (defined) on the third inner wall surface and at least two fourth projections formed (defined) spaced apart from each other in the axial direction on the fourth inner wall surface.

(Aspect 7) The electrical insulator as defined in Aspect 6, wherein the at least one fourth projection is formed (defined) between the at least two third projections in the axial direction, or the at least one third projection is formed (defined) between the at least two fourth projections in the axial direction.

(Aspect 8) The electrical insulator as defined in Aspect 7, wherein the at least one fourth projection is formed (defined) in (at) a center of the fourth inner wall surface in the axial direction and the at least two third projections are formed (defined) at an equal distance from the at least one fourth projection, or the at least one third projection is formed (defined) in (at) a center of the third inner wall surface in the axial direction and the at least two fourth projections are formed (defined) at an equal distance from the at least one third projection in the axial direction.

(Aspect 9) The electrical insulator as defined in any one of Aspects 1 to 4, wherein the second set of the projections includes at least two third projections formed (defined) on the third inner wall surface and at least two fourth projections formed (defined) on the fourth inner wall surface.

(Aspect 10) The electrical insulator as defined in Aspect 9, wherein the at least two third projections and the at least two fourth projections are formed (defined) at positions facing each other in the circumferential direction.

(Aspect 11) The electrical insulator as defined in Aspect 10, wherein the at least two third projections are formed (defined) at an equal distance from a center of the third inner wall surface in the axial direction, and the at least two fourth projections are formed (defined) at an equal distance from a center of the fourth inner wall surface in the axial direction.

(Aspect 12) The electrical insulator as defined in any one of Aspects 5 to 11, wherein the projections include the first set of projections that includes at least one first projection formed (defined) on the first inner wall surface and at least one second projection formed (defined) on the second inner wall surface.

(Aspect 13) The electrical insulator as defined in any one of Aspects 1 to 4, wherein the projections include the first set of projections that includes at least one first projection formed (defined) on the first inner wall surface and at least one second projection formed (defined) on the second inner wall surface.

(Aspect 14) The electrical insulator as defined in any one of Aspects 1 to 13, wherein a recess is recessed outward of the tooth insertion hole in (at) at least one of a first boundary between the first inner wall surface and the third inner wall surface, a second boundary between the first inner wall surface and the fourth inner wall surface, a third boundary between the second inner wall surface and the third inner wall surface and a fourth boundary between the second inner wall surface and the fourth inner wall surface.

(Aspect 15) A motor, having a stator and a rotor, the stator including a stator core, electrical insulators and a stator winding, the stator core being tubularly formed of electromagnetic steel sheets laminated in an axial direction, and having a yoke extending in a circumferential direction and teeth extending radially inward from the yoke, the electrical insulators being respectively fitted onto the teeth, the stator winding being wound around the electrical insulators fitted onto the teeth, wherein:

each of the electrical insulators comprises the electrical insulator as defined in any one of Aspects 1 to 14.

(Aspect 16) A compressor, having a compression mechanism part for compressing a working medium and a motor for driving the compression mechanism part, wherein:

the motor comprises the motor as defined in Aspect 15.

The structures of the electrical insulators, the stator core, the motor and the compressor of the present disclosure are not limited to the structures described in the above embodiments, but rather, may be added to, changed, replaced with alternatives or otherwise modified.

For example, the shape of the electrical insulators may be appropriately changed.

Each of the projections may be formed by one continuously extending protruding part or by a plurality of protruding parts spaced apart from each other.

The sectional shape of the projection is not limited to a quadrangular shape (such as a square or rectangular shape), but it may be various other shapes such as a rounded shape (including a circular shape).

The area of contact between the outer wall surface and the projection(s) may be appropriately set.

The extending direction of the projection may be appropriately set. For example, it may be set to a direction parallel (or substantially parallel) to the radial direction, or a direction oblique to the radial direction. Alternatively, it may be set to a direction parallel (or substantially parallel) to the axial direction, or a direction oblique to the axial direction, or it may be set to a direction parallel (or substantially parallel) to the circumferential direction, or a direction oblique to the circumferential direction.

The number of the first to fourth projections respectively formed (defined) on the first to fourth inner wall surfaces of the electrical insulator may be appropriately changed. For example, the (each) electrical insulator may have the second set of projections including at least one (or at least two) third projection(s) and at least one (or at least two) fourth projection(s). Alternatively, it may have the second set of projections including at least one third projection (or fourth projection) and at least two fourth projections (or third projections). It may have the first set of projections including at least one (or at least two) first projection(s) and at least one (or at least two) second projection(s). It may have the first of projections including at least one first projection (or second projection) and at least two second projections (or first projections). It may have the first and second groups of projections.

The arrangement positions (positions in the axial direction, positions in the radial direction, positions in the circumferential direction) of the projections formed (defined) on the first to fourth inner wall surfaces of the electrical insulator may be appropriately changed.

The shape, the number and the arrangement positions of the recesses formed in the boundaries between the first to fourth inner wall surfaces of the electrical insulator is appropriately set such that the resistance caused by contact between the first to fourth inner wall surfaces defining the tooth insertion hole and any burr(s) formed when punching the tooth insertion hole is reduced.

The shape of the stator core may be appropriately changed.

The stator core may be formed by one core member or by a plurality of core members. In the latter case, the shape and the number of the core members may be appropriately changed.

Motors having various structures can be used as the motor.

The compressor can be formed as various types of compressors such as a horizontal compressor or a vertical compressor.

Compression mechanism parts having various structures can be used as the compression mechanism part.

Each of the features or structures described in the embodiments may be used individually or in combination of appropriately selected ones.

EXPLANATION OF THE REFERENCE NUMERALS

10: compressor, 20: closed container, 20A: body part, 20B: lid part, 20C: bottom part, 21: closed container inner peripheral surface, 22: suction pipe, 23: discharge pipe, 24, 25: bearing, 30: compression mechanism part, 31: cylinder, 32: eccentric rotor, 3: compression chamber, 33*a*: outlet port, 40: rotary shaft, 100: motor, 110: stator,

120: stator core, 120A, 120B: stator core end surface, 120*a*: stator core interior space, 121: yoke, 121*a*: yoke end surface, 121*c*: yoke inner peripheral surface,

121*c*1, 121*c*2: yoke inner peripheral surface portion, 121*d*: yoke outer peripheral surface,

122, 122(1), 122(2): tooth, 122*a*, 122*b*: tooth end surface, 122*c*, 122*d*: tooth side surface, 122*e*: tooth inner peripheral surface,

130, 230, 330, 430, 530, 630, 730, 830: electrical insulator,

130*a*, 230*a*, 330*a*, 430*a*, 530*a*, 630*a*, 730*a*, 830*a*: through hole,

131*a* to 131*d*, 231*a* to 231*d*, 331*a* to 331*d*, 431*a* to 431*d*, 531*a* to 531*d*, 631*a* to 631*d*, 731*a* to 731*d*, 831*a* to 831*d*: inner wall surface,

132 to 135, 232 to 235, 332 to 334, 432, 433, 532, 533, 632 to 635, 732 to 735, 736 to 739, 832 to 839: projection,

132*a* to 132*c*, 133*a* to 133*c*, 134*a* to 134*c*, 135*a* to 135*c*, 232*a* to 232*c*, 233*a* to 233*c*, 234*a* to 234*c*, 235*a* to 235*c*, 332*a* to 332*c*, 333*a* to 333*c*, 334*a* to 334*c*, 432*a* to 432*c*, 433*a* to 433*c*, 532*a* to 532*c*, 533*a* to 533*c*, 632*a* to 632*c*, 633*a* to 633*c*, 634*a* to 634*c*, 635*a* to 635*c*, 732*a*, 733*a*, 734*a*, 735*a*, 736*a*, 737*a*, 738*a*, 739*a*, 832*a* 839*a*: outer wall surface,

140, 150, 240, 250, 340, 350, 440, 450, 540, 550, 640, 650, 740, 750, 840, 850: flange part 141, 142, 151, 152, 241, 242, 251, 252, 341, 342, 351, 352, 441, 442, 451, 452, 541, 542, 551, 552, 641, 642, 651, 652, 741, 742, 751, 752, 841, 842, 851, 852: flange part end surface,

143*a* to 143*d*, 153*a* to 153*d*, 243*a* to 243*d*, 253*a* to 253*d*, 343*a* to 343*d*, 353*a* to 353*d*, 443*a* to 443*d*, 453*a* to 453*d*, 543*a* to 543*d*, 553*a* to 553*d*, 643*a* to 643*d*, 653*a* to 653*d*, 743*a* to 743*d*, 753*a* to 753*d*: flange part outer wall surface,

160, 260, 360, 460, 560, 660, 760, 850: body part,

162*a* to 162*d*, 262*a* to 262*d*, 362*a* to 362*d*, 462*a* to 462*d*, 562*a* to 562*d*, 662*a* to 662*d*, 762*a* to 762*d*: body part outer wall surface,

170*a* to 170*d*, 270*a* to 270*d*, 370*a* to 370*d*, 470*a* to 470*d*, 570*a* to 570*d*, 670*a* to 670*d*, 770*a* to 770*d,*

870*a* to 870*d*: recess,

170: stator winding,

180: rotor, 190: rotor core, 190A, 190B: rotor core end surface,

191: rotor core inner peripheral surface, 192: rotor core outer peripheral surface,

220: stator core, 220A: stator core end surface, 221: yoke part, 221*a*: yoke part end surface, 221*c*: yoke part inner peripheral surface, 221*c*1, 221*c*2: yoke part inner peripheral surface portion,

221*d*: yoke part outer peripheral surface, 221*e*, 221*f*: yoke part side surface,

222, 222(1), 222(2): tooth part, 222*a*: tooth part end surface, 222*c*, 222*d*: tooth part side surface, 222*e*: tooth part inner peripheral surface, 225, 225(1), 225(2): core member,

320: stator core, 320A: stator core end surface, 321: yoke part, 321*a*: yoke part end surface, 321*c*: yoke part inner peripheral surface, 321*c*1 to 321*c*3: yoke part inner peripheral surface portion, 321*d*: yoke part outer peripheral surface, 321*e*: recess, 322A: tooth base part, 322B: tooth tip part, 322: base part, 322*a*: base part end surface, 322*c*, 322*d*: base part side surface,

322*e*: base part outer peripheral surface, 323: tip part, 323*a*: tip part end surface,

323*c*: tip part inner peripheral surface, 323*d*: tip part outer peripheral surface,

323*d*1, 323*d*2: tip part outer peripheral surface portion, 323*e*, 323*f*: tip part side surface,

325A: first core member, 325B, 325B(1), 325B(2): second core member

The invention claimed is:

1. An electrical insulator configured to be fitted onto a radially extending tooth of a stator core, the tooth having a first outer wall surface axially spaced from a second outer wall surface, and a third outer wall surface circumferentially spaced from a fourth outer wall surface, the electrical insulator including a tooth insertion hole in which the tooth is configured to be received, the electrical insulator being configured to be mounted on the tooth and restrained from moving relative to the tooth, the electrical insulator including an inner wall defining the tooth insertion hole, the inner wall including a first inner wall surface configured to face the first outer wall surface of the tooth, a second inner wall surface configured to face the second outer wall surface of the tooth, a third inner wall surface configured to face the third outer wall surface of the tooth and a fourth inner wall surface configured to face the fourth inner wall surface of the tooth in a state in which the tooth is in the tooth insertion hole, and the inner wall including at least two third projections formed, and axially spaced apart, on the third inner wall surface and at least one fourth projection formed on the fourth inner wall surface, wherein the electrical insulator is configured to be restrained from moving relative to the tooth by abutment between the third and fourth outer wall surfaces of the tooth and the two third projections and the at least one fourth projection of the electrical insulator, respectively.

2. The electrical insulator as defined in claim 1, further comprising:

at least one first projection formed on the first inner wall surface, and at least one second projection formed on the second inner wall surface, wherein the electrical insulator is configured to be further restrained from moving relative to the tooth by abutment between the first and second outer wall surfaces of the tooth and the at least one first projection and the at least one second projection, respectively.

3. The electrical insulator as defined in claim 1, wherein a recess is provided in the tooth insertion hole at at least one boundary selected from a group consisting of a first boundary between the first inner wall surface and the third inner wall surface, a second boundary between the first inner wall surface and the fourth inner wall surface, a third boundary between the second inner wall surface and the third inner wall surface and a fourth boundary between the second inner wall surface and the fourth inner wall surface.

4. The electrical insulator as defined in claim 1, wherein the at least two third projections and the at least one fourth projection extend in the radial direction.

5. The electrical insulator as defined in claim 1, wherein the at least one fourth projection is formed between the two third projections in the axial direction.

6. The electrical insulator as defined in claim 5, wherein:

the at least one fourth projection is formed at a center of the fourth inner wall surface in the axial direction and the at least two third projections are formed at an equal distance from the at least one fourth projection in the axial direction.

7. A motor, having a stator and a rotor, the stator including a stator core, electrical insulators and one or more stator windings, the stator core being tubularly composed of electromagnetic steel sheets laminated in an axial direction and having a yoke extending in a circumferential direction and teeth extending radially inward from the yoke, the electrical insulators being respectively fitted onto the teeth, the stator winding(s) being wound around the electrical insulators fitted onto the teeth, wherein:

each of the electrical insulators comprises the electrical insulator as defined in claim 1.

8. A compressor, having a compression mechanism part for compressing a working medium and a motor for driving the compression mechanism part, wherein:

the motor comprises the motor as defined in claim 7.

9. The electrical insulator as defined in claim 1, wherein the at least one fourth projection formed on the fourth inner wall surface comprises at least two fourth projections formed on the fourth inner wall surface.

10. The electrical insulator as defined in claim 9, wherein the at least two third projections and the at least two fourth projections extend in the radial direction.

11. The electrical insulator as defined in claim 9, wherein a recess is provided in the tooth insertion hole at at least one boundary selected from a group consisting of a first boundary between the first inner wall surface and the third inner wall surface, a second boundary between the first inner wall surface and the fourth inner wall surface, a third boundary between the second inner wall surface and the third inner wall surface and a fourth boundary between the second inner wall surface and the fourth inner wall surface.

12. The electrical insulator as defined in claim 9, further comprising:

at least one first projection formed on the first inner wall surface, and at least one second projection formed on the second inner wall surface, wherein the electrical insulator is configured to be further restrained from moving relative to the tooth by abutment between the first and second outer wall surfaces of the tooth and the at least one first projection and the at least one second projection, respectively.

13. The electrical insulator as defined in claim 9, wherein the at least two third projections and the at least two fourth projections are formed at positions facing each other in the circumferential direction.

14. The electrical insulator as defined in claim 13, wherein the at least two third projections are formed at an equal distance from a center of the third inner wall surface in the axial direction, and the at least fourth second projections are formed at an equal distance from a center of the fourth inner wall surface in the axial direction.

15. A motor, having a stator and a rotor, the stator including a stator core, electrical insulators and one or more stator windings, the stator core being tubularly composed of electromagnetic steel sheets laminated in an axial direction and having a yoke extending in a circumferential direction and teeth extending radially inward from the yoke, the electrical insulators being respectively fitted onto the teeth, the stator winding(s) being wound around the electrical insulators fitted onto the teeth, wherein:

each of the electrical insulators comprises the electrical insulator as defined in claim 9.

16. A compressor, having a compression mechanism part for compressing a working medium and a motor for driving the compression mechanism part, wherein:

the motor comprises the motor as defined in claim 15.

17. The electrical insulator as defined in claim 9, further comprising:

two first projections formed on the first inner wall surface, and two second projections formed on the second inner wall surface, wherein the electrical insulator is configured to be further restrained from moving relative to the tooth by abutment between the first and second outer wall surfaces of the tooth and the two first projections and the two second projections, respectively.

18. The electrical insulator as defined in claim 17, wherein:

the two first projections and the two second projections are formed at positions facing each other in the axial direction, the two first projections are formed at an equal distance from a center of the first inner wall surface in the circumferential direction, and the two second projections are formed at an equal distance from a center of the second inner wall surface in the circumferential direction.

19. An electrical insulator configured to be fitted onto a radially extending tooth of a stator core, the tooth having a first outer wall surface axially spaced from a second outer wall surface, and a third outer wall surface circumferentially spaced from a fourth outer wall surface, the electrical insulator including a tooth insertion hole in which the tooth is configured to be received, the electrical insulator being configured to be mounted on the tooth and restrained from moving relative to the tooth, the electrical insulator including an inner wall defining the tooth insertion hole and at least two projections that protrude from the inner wall into the tooth insertion hole, the inner wall including a first inner wall surface configured to face the first outer wall surface of the tooth, a second inner wall surface configured to face the second outer wall surface of the tooth, a third inner wall surface configured to face the third outer wall surface of the tooth and a fourth inner wall surface configured to face the fourth inner wall surface of the tooth in a state in which the tooth is in the tooth insertion hole, and the inner wall including at least one set of projections selected from a group consisting of a first set of projections located on the first inner wall surface and the second inner wall surface and a second set of projections located on the third inner wall surface and the fourth inner wall surface, the first set of projections including at least one first projection formed on the first inner wall surface and at least one second projection formed on the second inner wall surface, and the second set of projections including at least one third projection formed on the third inner wall surface and at least one fourth projection formed on the fourth inner wall surface, wherein the electrical insulator is configured to be restrained from moving relative to the tooth by abutment between the first and second outer wall surfaces of the tooth and the projections of the first set of projections and/or by abutment between the third and fourth outer wall surfaces of the tooth and the projections of the second set of projections, and wherein the projections include the first of projections.

20. An electrical insulator configured to be fitted onto a radially extending tooth of a stator core, the tooth having a first outer wall surface axially spaced from a second outer wall surface, and a third outer wall surface circumferentially spaced from a fourth outer wall surface, the electrical insulator including a tooth insertion hole in which the tooth is configured to be received, the electrical insulator being configured to be mounted on the tooth and restrained from moving relative to the tooth, the electrical insulator including an inner wall defining the tooth insertion hole and at least two projections that protrude from the inner wall into the tooth insertion hole, the inner wall including a first inner wall surface configured to face the first outer wall surface of the tooth, a second inner wall surface configured to face the second outer wall surface of the tooth, a third inner wall surface configured to face the third outer wall surface of the tooth and a fourth inner wall surface configured to face the fourth inner wall surface of the tooth in a state in which the tooth is in the tooth insertion hole, and the inner wall including at least one set of projections selected from a group consisting of a first set of projections located on the first inner wall surface and the second inner wall surface and a second set of projections located on the third inner wall surface and the fourth inner wall surface, the first set of projections including at least one first projection formed on the first inner wall surface and at least one second projection formed on the second inner wall surface, and the second set of projections including at least one third projection formed on the third inner wall surface and at least one fourth projection formed on the fourth inner wall surface, wherein the electrical insulator is configured to be restrained from moving relative to the tooth by abutment between the first and second outer wall surfaces of the tooth and the projections of the first set of projections and/or by abutment between the third and fourth outer wall surfaces of the tooth and the projections of the second set of projections, and wherein the at least one third projection and the at least one fourth projection extend in the radial direction or the axial direction, and the at least one first projection and the at least one second projection extend in the radial direction or the circumferential direction.

* * * * *